(12) United States Patent
Hauser

(10) Patent No.: US 12,014,327 B2
(45) Date of Patent: Jun. 18, 2024

(54) METHOD AND SYSTEM FOR IDENTIFYING PALLET SHORTAGES

(71) Applicant: Genpact Luxembourg S.à r.l. II, Luxembourg (LU)

(72) Inventor: David I. Hauser, Merrick, NY (US)

(73) Assignee: GENPACT USA, INC., New York, NY (US)

( * ) Notice: Subject to any disclaimer, the term of this patent is extended or adjusted under 35 U.S.C. 154(b) by 574 days.

(21) Appl. No.: 17/217,883

(22) Filed: Mar. 30, 2021

(65) Prior Publication Data

US 2022/0318747 A1 Oct. 6, 2022

(51) Int. Cl.
| | |
|---|---|
| *G06Q 10/0875* | (2023.01) |
| *G06F 40/205* | (2020.01) |
| *G06F 40/40* | (2020.01) |
| *G06N 3/045* | (2023.01) |
| *G06Q 10/083* | (2023.01) |
| *G06T 7/62* | (2017.01) |

(52) U.S. Cl.
CPC ....... *G06Q 10/0875* (2013.01); *G06F 40/205* (2020.01); *G06F 40/40* (2020.01); *G06N 3/045* (2023.01); *G06Q 10/083* (2013.01); *G06T 7/62* (2017.01); *G06T 2207/20081* (2013.01); *G06T 2207/20084* (2013.01)

(58) Field of Classification Search
CPC .. G06Q 10/08; G06Q 10/0833; G06Q 30/018; G06Q 10/30; G06F 16/164; G06F 16/38
USPC ......................................................... 356/4.01
See application file for complete search history.

(56) References Cited

U.S. PATENT DOCUMENTS

| | | | | |
|---|---|---|---|---|
| 9,547,085 B2* | 1/2017 | Bell | ....................... | G01S 17/42 |
| 9,902,539 B2* | 2/2018 | Poss | ..................... | B65F 1/1473 |
| 11,210,266 B2* | 12/2021 | Dain | ..................... | G06F 16/164 |
| 2014/0083058 A1* | 3/2014 | Issing | ..................... | B65B 35/30 |
| | | | | 53/473 |
| 2015/0331105 A1* | 11/2015 | Bell | ....................... | G01S 7/4808 |
| | | | | 356/4.01 |
| 2019/0130417 A1* | 5/2019 | Watt | ..................... | G06Q 30/018 |
| 2019/0197498 A1* | 6/2019 | Gates | ..................... | G06T 7/0008 |
| 2020/0132530 A1* | 4/2020 | Ayoub | ..................... | G06Q 10/08 |
| 2020/0242080 A1* | 7/2020 | Dain | ..................... | G06F 16/164 |
| 2020/0361659 A1* | 11/2020 | Whitman | ............... | B65D 19/16 |

* cited by examiner

*Primary Examiner* — Olusegun Goyea

(74) *Attorney, Agent, or Firm* — GOODWIN PROCTER LLP

(57) ABSTRACT

A method for identifying shipment shortages on pallets is provided. In some embodiments, the method includes taking one or more digital images of a pallet with a shipment thereon to estimate the shipment's volume. The method further includes estimating an anticipated shipment volume based on the shipment's invoice information, and comparing the estimated shipment volume to the anticipated shipment volume to calculate volume mismatches. The volume mismatches can be used as an indicator of any shipment errors.

20 Claims, 19 Drawing Sheets

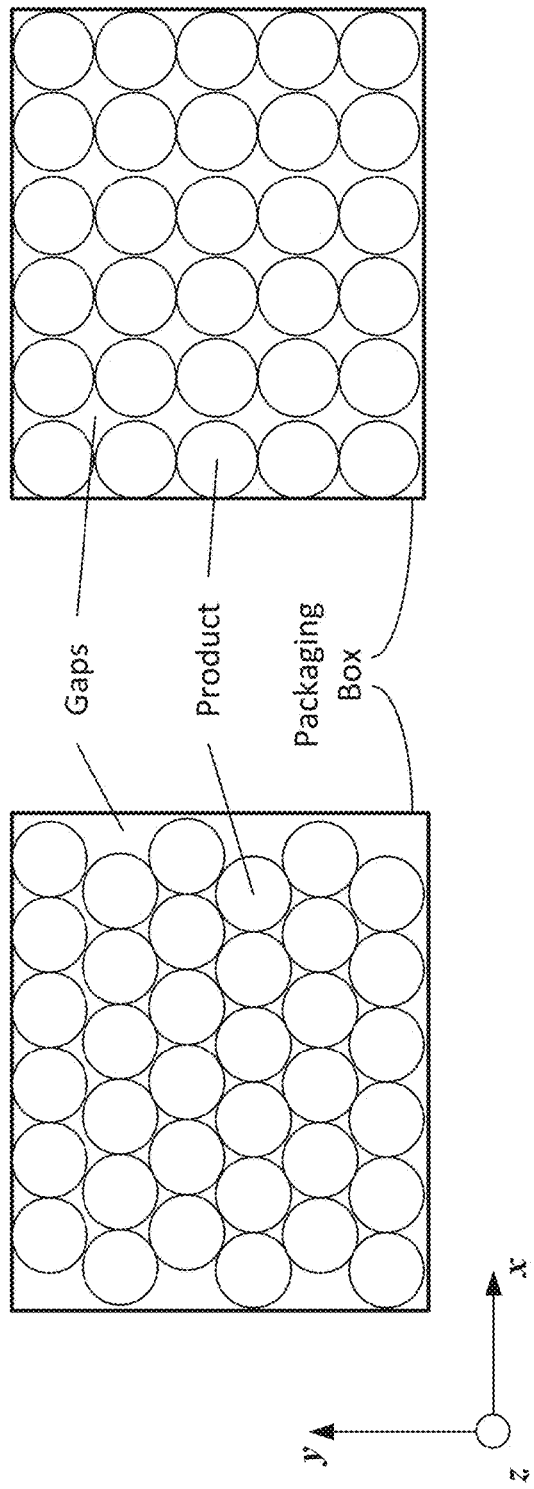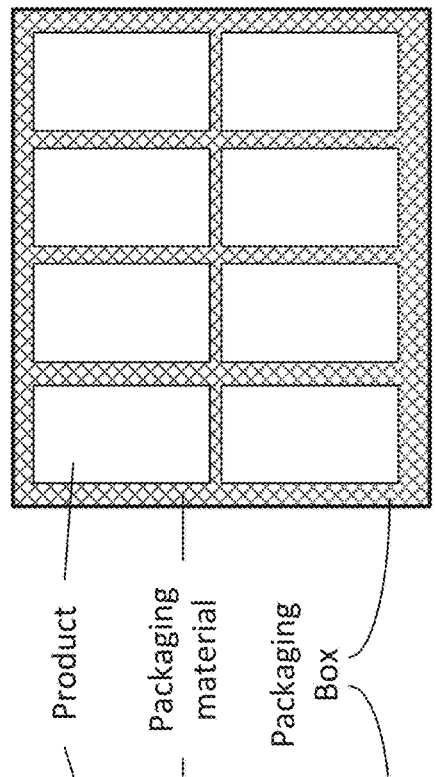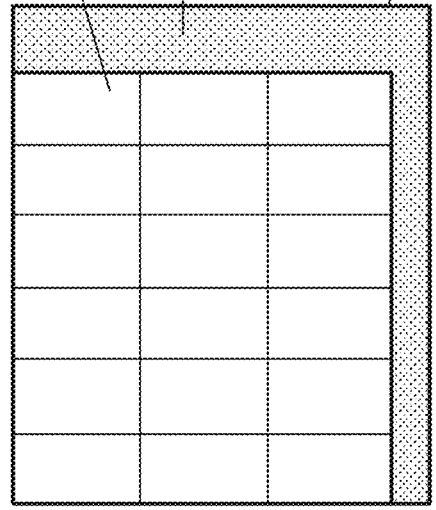

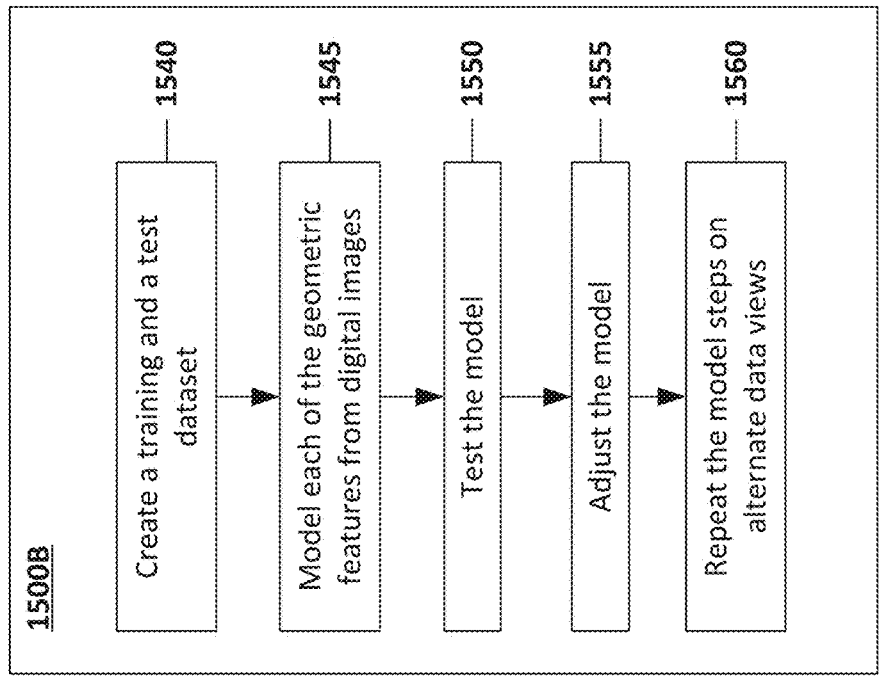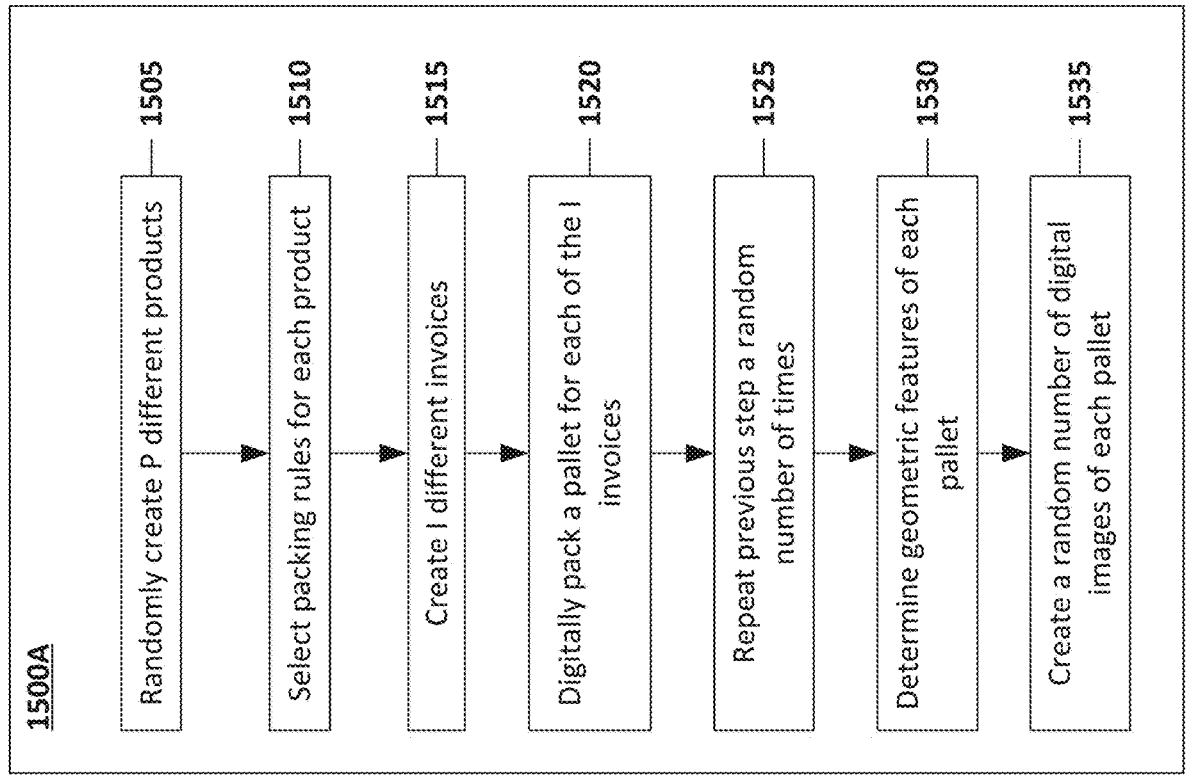
Fig. 15

METHOD AND SYSTEM FOR IDENTIFYING PALLET SHORTAGES

TECHNICAL FIELD

This disclosure relates to a method and system for identifying, in real time, shipment shortages or overages for the shipping process of goods to a client.

BACKGROUND

Pallets are flat transport structures used to support a shipment of goods while the shipment is stored or transported from one location to another with a forklift, a pallet jack, a front loader, a jacking device, or an erect crane. The packaged goods are often placed on a pallet, secured with strapping, stretch wrap or shrink wrap and shipped. The pallet has supplanted older forms of crating, such as the wooden box and the wooden barrel, as it works well with modern packaging like corrugated boxes and intermodal containers commonly used for bulk shipping. While most pallets are wooden, pallets can also be made of plastic, metal, paper, and recycled materials.

The pallet has become a structural foundation of a "unit load", which refers to the size of an assemblage into which a number of individual items are combined for ease of storage and handling. For example, a pallet load can represent a unit load, which can be moved easily with a pallet jack or forklift truck. A unit load can be packed tightly into a warehouse rack, intermodal container, truck or boxcars, and yet easily be broken apart at a distribution point, such as a distribution center, wholesaler, or retail store for sale to consumers or for use. Most consumer and industrial products move through the supply chain in unitized or unit load form for at least part of their distribution cycle. Unit loads make handling, storage, and distribution more efficient. They help reduce handling costs and damage by reducing individual product handling.

At the receiving end of a shipment, the pallets with the shipment are audited against the order and/or the delivery invoices. For purposes of auditing, unpacking or weighing each and every shipment on a pallet may not be practical or feasible for a number of reasons. For example, unpacking large shipments can be a time consuming process that may require re-packaging. On the other hand, on site scales used for weighing the pallets may not be calibrated properly or it can be impossible to weigh hundreds (much less thousands) of shipments on pallets. Further, weighing pallets has little value when each pallet contains different products at different quantities—for example, packages with two or more products each having a different stock keeping unit (SKU) number. All of the above factors, can make real time auditing of a shipment challenging. For this reason, any shipment shortages can go unnoticed until the shipment in each pallet is unpacked and inspected at a later time.

SUMMARY

To address the aforementioned shortcomings, a method and a system for identifying, in real time, shipment shortages as pallets with shipments are loaded to, or offloaded from, a track or a container is provided. The method estimates, in real time, the shipment's volume (or any other geometrical property including surface area, dimensions, and the like) on a pallet and compares it to an anticipated shipment volume (or any other geometrical property including surface area, dimensions, and the like) based on the shipment's invoice information, purchase order, or any other type of documentation that includes the shipment's contents, such as bill related documents, an excel spreadsheet that lists the items in the shipment, and the like. In some embodiments, the method includes estimating the shipment's volume from one or more digital images of the shipment on the pallet and comparing it with the anticipated shipment's volume based on the shipment's invoice information. The method then provides alerts when mismatches are identified between the aforementioned shipment volumes. In some embodiments, the volume mismatches are used as an indicator of a shipment error. In some embodiments, the method requires one or more digital images of the shipment on the pallet, an invoice or other documentation that includes product quantities included in the shipment, and trained computer models capable of analyzing the information received to provide the aforementioned shipments volumes and comparisons.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

FIGS. 3-6 are top views of packaged products, according to some embodiments.

FIG. 15 shows flow charts which describe a creation process of synthetic data and a training process of an artificial intelligence model using the synthetic data, according to some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1A:
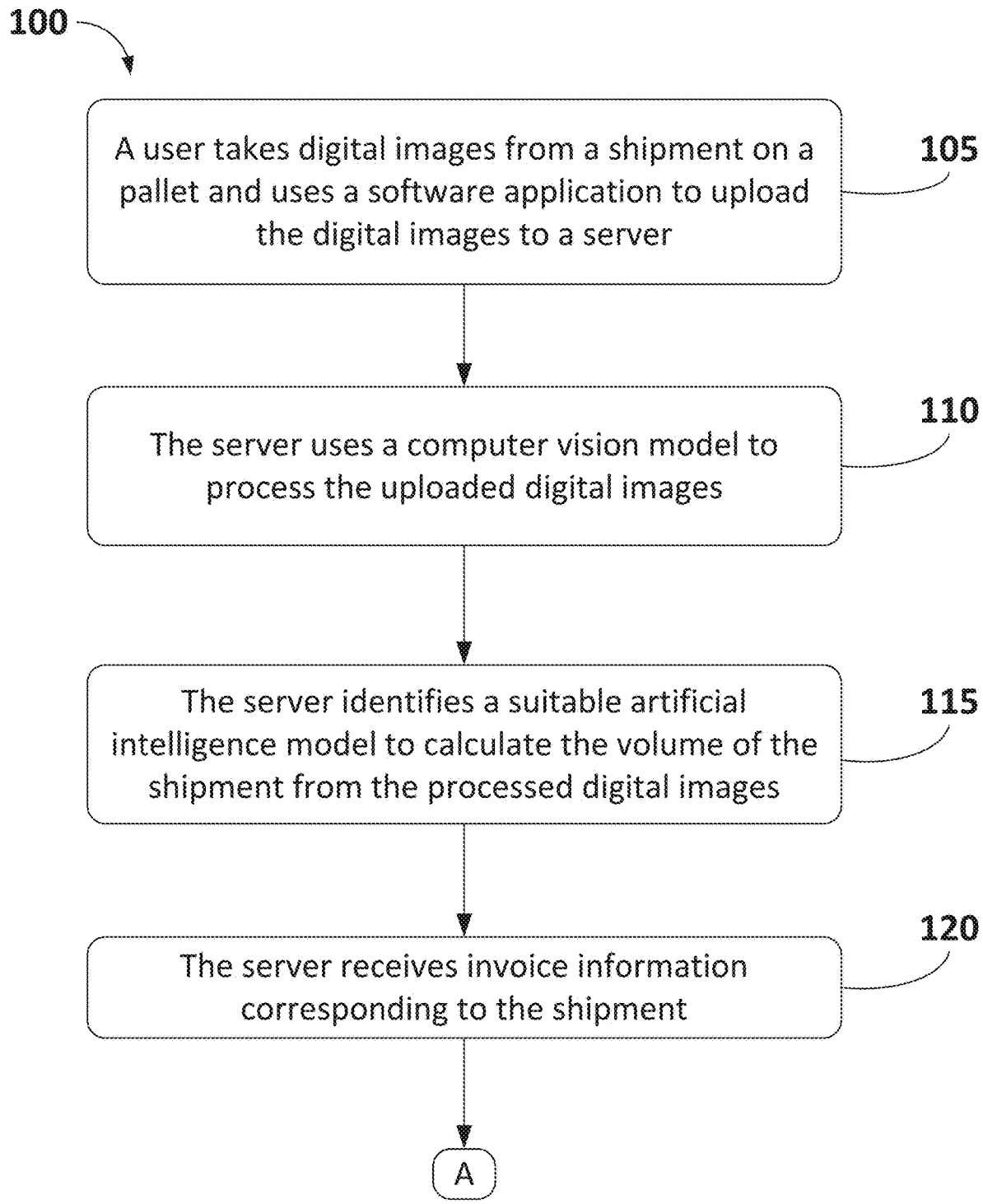
FIGS. 1A and 1B are flow charts of a process for identifying shipment shortages on pallets, according to some embodiments.
Figure 1B:
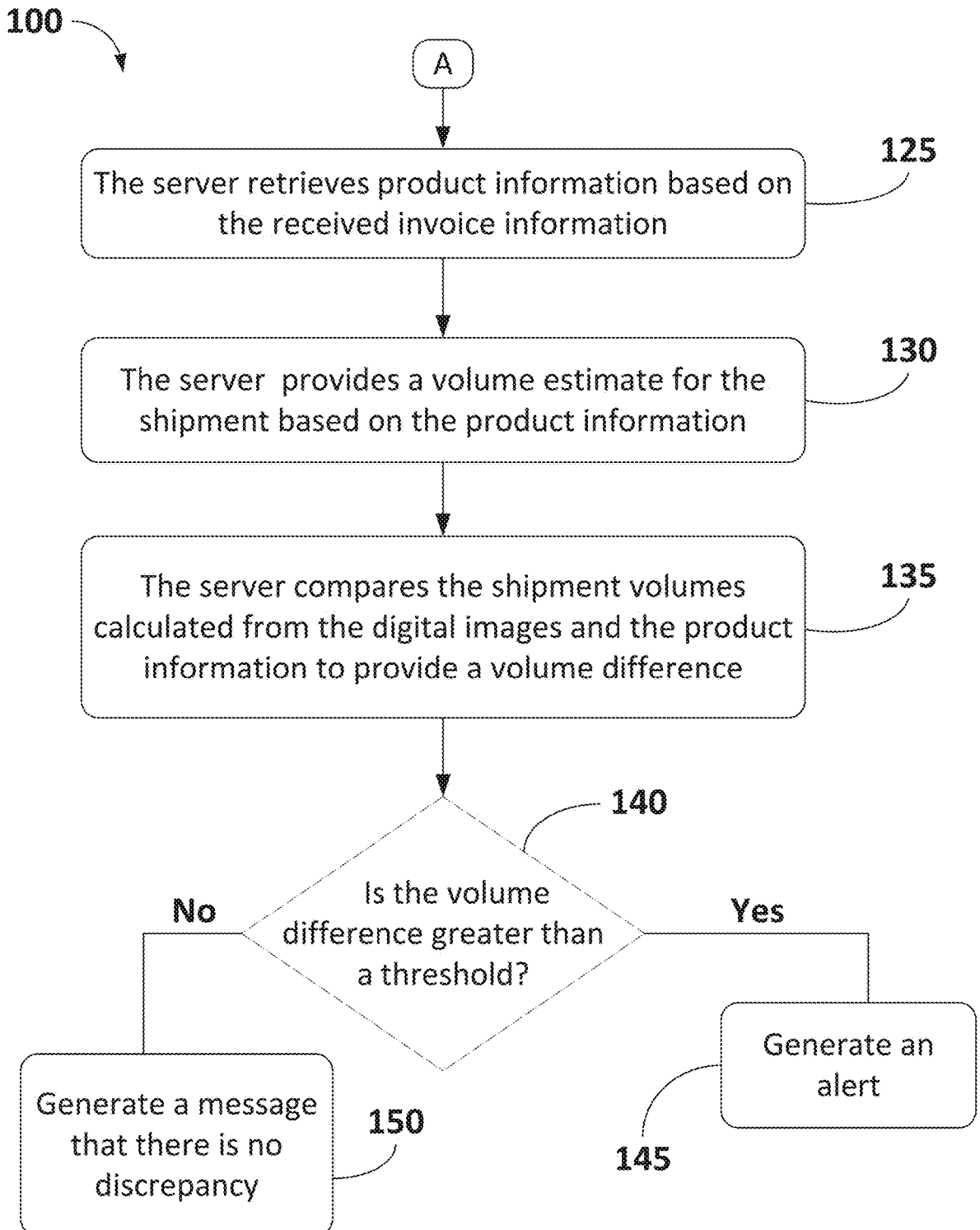

In some embodiments, FIGS. 1A and 1B are flow charts of method 100 for identifying shipment shortages on pallets. According to some embodiments, the operations of method 100 are executed using an exemplary system 700 shown in FIG. 7. By way of example and not limitation, method 100 can be executed, at least in part, by a software application 702 running on mobile device 704 operated by a user 706. By way of example and not limitation, mobile device 704 can be a smart phone device, a tablet, a tablet personal computer (PC), or a laptop PC. In some embodiments, mobile device 704 can be any suitable electronic device connected to a network 707 via a wired or wireless connection and capable of running software applications like software application 702. In some embodiments, mobile device 704 can be a desktop PC running software application 702. In some embodiments, software application 702 can be installed on mobile device 704 or be a web-based application running on mobile device 704. By way of example and not limitation, user 706 can be a person receiving the shipment, a person delivering the shipment, a forklift operator who offloads the shipment, or a person who is working remotely and has access to software application 702 via mobile device 704.

Network 707 can be an intranet network, an extranet network, a public network, or combinations thereof used by software application 702 to exchange information with one or more remote or local servers, such as server 720. According to some embodiments, software application 702 can be configured to exchange information, via network 708, with additional servers that belong to system 700 or other systems similar to system 700 not shown in FIG. 7 for simplicity.

In some embodiments, server 720 is configured to store, process and analyze the information received from user 706, via software application 702, and subsequently transmit in real time processed data back to software application 702. Server 720 can include a number of modules and components discussed below with reference to the operations of method 100. According to some embodiments, server 720 performs at least some of the operations discussed in method 100. In some embodiments, server 720 can be a cloud-based server.

Figure 2:
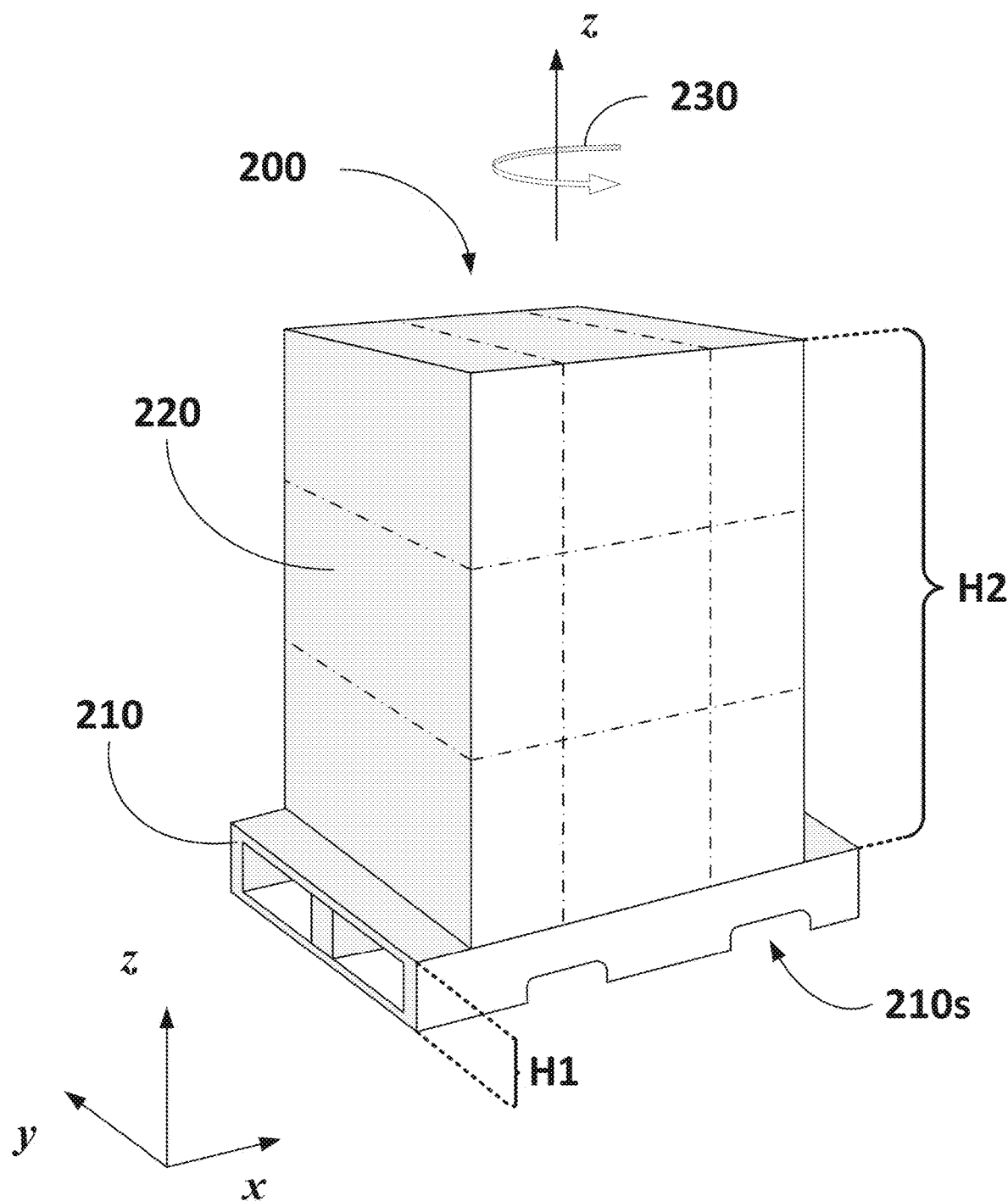
FIG. 2 is an isometric view of a shipment on a pallet, according to some embodiments.
Figure 7:
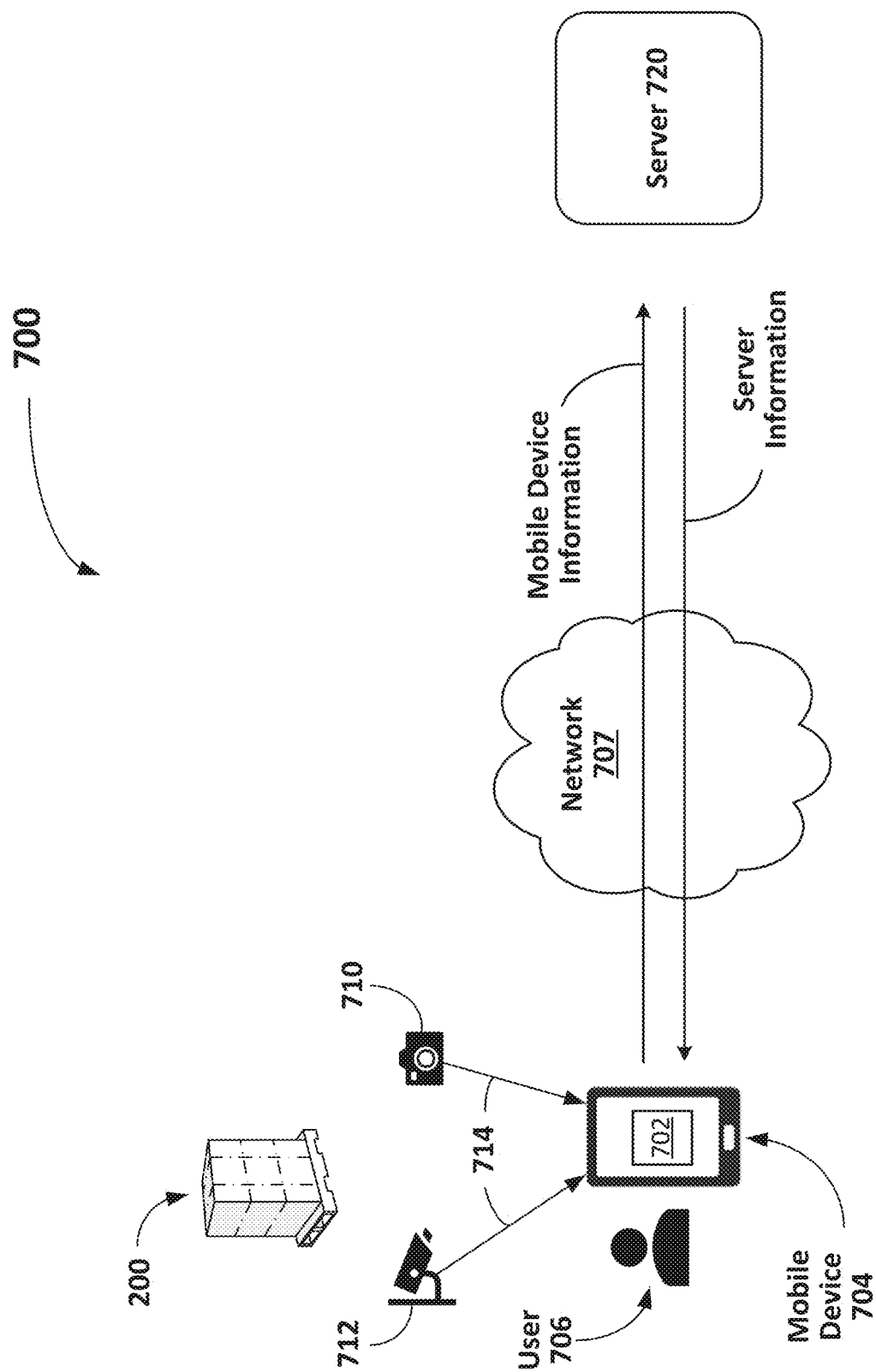
FIG. 7 is a system for identifying shipment shortages on pallets using the methods described herein, according to some embodiments.
Figure 9:
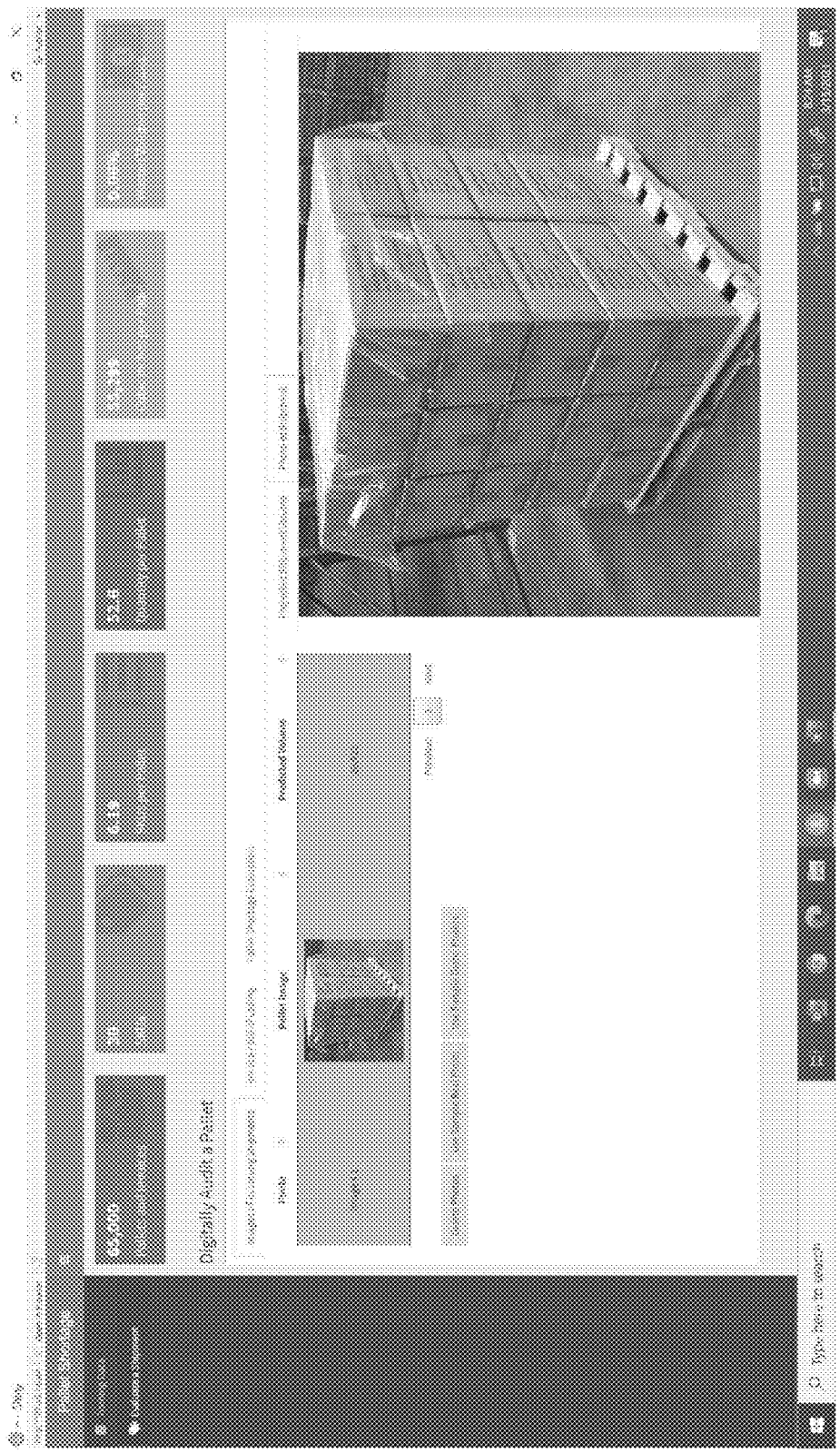
FIG. 9 is a screen shot of a software application showing a digital image of a shipment, according to some embodiments.

In referring to FIG. 1A, method 100 begins with operation 105 where a user (e.g., user 706) takes digital images (e.g., one or more) of a recently received shipment on a pallet and uses software application 702 to upload the digital images to a server, such as server 720 shown in FIG. 7. According to some embodiments, FIG. 2 shows an exemplary shipment 200 on a pallet 210 whose digital images are obtained by user 706 and are uploaded to server 720 according to operation 105. By way of example and not limitation, pallet 210 can be one of many pallets received by user 706 in a truck load. In some embodiments, each pallet 210 is accompanied by an invoice or other documentation in electronic form or a hard copy form, which includes an itemized list of the all the products in shipment 200 and their respective quantities. According to some embodiments, FIG. 9 is a screen shot of software application 702 showing the digital image of the shipment with the pallet that user 706 has uploaded to server 720.

In referring to FIG. 2, shipment 200 is shown as a collection of stackable rectangular-shaped boxes 220 for simplicity. However, this is not limiting and boxes 200 may be a collection of boxes having different shapes and sizes. Further, boxes 200 are not required to have vertical edges or a similar geometrical shape. By way of example and not limitation, boxes 220 in shipment 200 can form a pyramid, a cylinder, a cube, a rectangular, or have any other shape provided that it can be supported by pallet 210. In some embodiments, the edges of shipment 200 may exceed the edges of pallet 210. In some embodiments, two or more pallets 210 can be joined together to support shipment 200. For example, two or more pallets can be used to support an oversized shipment. In some embodiments, pallet 210 may have a non-standard size or a custom size to accommodate the shape of shipment 200. Additionally, pallet 210 can have any commercially available size. In some embodiments, pallet 210 can be made of any material, such as wood, plastic, metal, paper, or recycled materials.

In some embodiments, user 706 uses a digital camera or a portable electronic device equipped with a digital camera to obtain the digital images of shipment 200 according to operation 105. For example, and in referring to FIG. 7, user 706 can take the digital images with mobile device 704 (e.g., if equipped with a digital camera) or use an external digital camera, such as digital camera 710. In some embodiments, user 706, if working remotely, may obtain the digital images of shipment 200 from a person receiving shipment 200 or a person delivering shipment 200. In some embodiments, the digital images of shipment 200 can be taken with a surveillance camera, like surveillance camera 712, which can be attached to the walls or the ceiling of the building where shipment 200 is being delivered. In some embodiments, the digital images of shipment 200 may be obtained from cameras attached to the forklift used to move the pallets with the shipment. Alternatively, the digital images of shipment 200 can be obtained from a set of cameras strategically positioned in the dock area. In some embodiments, placement of the digital cameras in locations where the viewing angle of the pallets with the shipment remains constant between images improves the modeling yield because it eliminates user-induced variation. However, this is not always possible, and for this reason the models described below are trained to compensate for variations in the viewing angle between the images.

In some embodiments, user 706 can upload the digital images taken by external digital camera 710 or surveillance camera 712 in software application 702 via wireless or wired connections 714, a memory stick, a memory card, or another suitable data transfer medium. In some embodiments, the digital images from digital camera 710 or surveillance camera 712 are uploaded directly to server 720 via network 708 without the intervention of mobile device 704 and software application 702. For example, external digital camera 710 and surveillance camera 712 can be directly or indirectly communicatively coupled to network 708 via a wired or wireless connection not shown in FIG. 7. In some embodiments, the digital images taken by external digital camera 710 or surveillance camera 712 can be stored in a cloud storage (not shown in FIG. 7), and at a later time or immediately, either downloaded to mobile device 704 or directly uploaded to server 720.

In some embodiments, the digital images are multi-view images—e.g., images obtained from different angles around a vertical direction (e.g., the z-axis) of shipment 200 and pallet 210 as shown by directional arrow 230 in FIG. 2. Acquiring multi-view images of shipment 200 improves the accuracy of the volume calculation performed in a subsequent operation of method 100. This is because multi-view images can compensate for poor lighting conditions often present in warehouses or loading-dock settings and provide additional measurement points, which reduce the statistical error in the calculated measurements.

Figure 8:
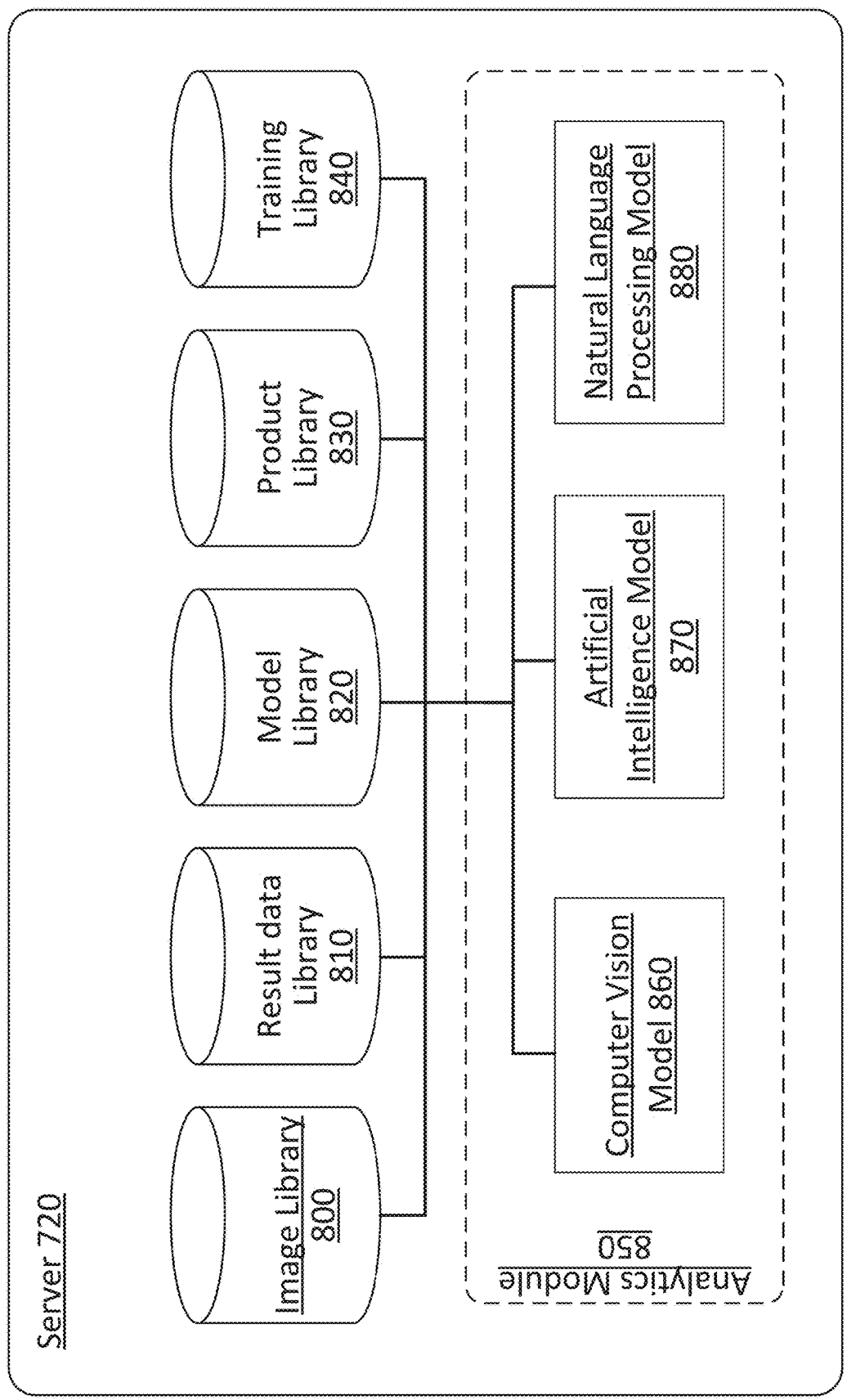
FIG. 8 is a server used as part of a system for identifying shipment shortages on pallets using the methods described herein, according to some embodiments.

In referring to FIG. 8, the received digital images can be stored in server 720 within an image library 800. According to some embodiments, FIG. 8 shows selective components of server 720 used to perform the operations of method 100. Server 720 may include additional components not shown in FIG. 8. These additional components are omitted merely for simplicity. These additional components may include, but are not limited to, computer processing units (CPUs), graphical processing units (GPUs), memory banks, graphic adaptors, external ports and connections, peripherals, power supplies, etc. required for the operation of server 720. The aforementioned additional components, and other components, required for the operation of server 720 are within the spirit and the scope of this disclosure. By way of example and not limitation, image library 800 can be a database where the digital images received from mobile device 704, or external digital camera 710 and surveillance camera 712, are stored. By way of example and not limitation, image library 800 can be a hard disk drive (HDD), a solid state drive (SSD), a memory bank, or another suitable storage medium to which other components of server 720 have read and write access.

In referring to FIG. 1A, method 100 continues with operation 110 where server 720 uses a computer vision model to process the uploaded images stored in image library 800. According to some embodiments, and in referring to FIG. 8, server 720 includes an analytics module 850, which in turn includes one or more models responsible for processing and analyzing all the information received by server 720. For example, the models in the analytics module 850 can have access to the digital images received in image library 800.

According to some embodiments, the analytics module 850 of server 720 includes a computer vision model 860, an artificial intelligence (AI) model 870, and a natural language processing (NLP) model 880. In some embodiments, the analytics module 850 of server 720 may only include a subset of the aforementioned models or at least one of the aforementioned models and additional models may be present on other servers communicatively coupled to server 720. For example, analytics module 850 of server 720 may only include computer vision model 860 and NLP model 880, with AI model 870 being on another server communicatively coupled to server 720. Alternatively, server 720 may only include computer vision model 860, with NLP model 880 and AI model 870 being on another server communicatively coupled to server 720. All possible permutations and combinations, including the ones described above, are within the spirit and the scope of this disclosure.

In some embodiments, computer vision model 860 is trained to analyze/process each digital image and identify the edge boundaries of pallet 210 and shipment 200. Further, computer vision model 860 can be trained to identify, from each digital image, the camera position relative to shipment 200 and pallet 210 and make corrections to the digital image to eliminate perspective distortions. Thereafter, computer vision model 860 can use projective geometry on the corrected digital image to obtain distortion-free length, width (depth), and height measurements for shipment 200 and pallet 210. By way of example and not limitation, the camera position information can include elevation, orientation, tilt, or any combination thereof relative to shipment 200 and pallet 210.

In some embodiments, computer vision model 860 can use the pallet dimensions to establish a scaling factor, such as the number of pixels per unit length. For example, computer vision model 860 may establish that a known height H1 of pallet 210 shown in FIG. 2 corresponds to X number of pixels (e.g., 30, 80, 100, 300, 1000 pixels). This information can be used to calculate the scaling factor (e.g., the number of pixels per unit length)—which can be later used to extrapolate height H2, or any other dimensions, of shipment 200 based on the corrected image.

According to some embodiments, any combination of the aforementioned information (e.g., the camera position, the edge locations, the scaling factor, and/or the dimensions of shipment 200 and pallet 210) can be used as input parameters for AI model 870. Additional information that can be used as input parameters for AI model 870 include, but are not limited to, whether the edges of shipment 200 exceed the edges of pallet 210 and by how much, the angle of rotation for the images, etc.

In some embodiments, computer vision model 860 can be trained to quickly calculate the shipment's volume based on a "shipment to pallet" pixel ratio. For example, computer vision model 860 may process the digital image and find that A % of the pixels in the digital image are occupied by shipment 200 and B % of the pixels in the digital image are occupied by pallet 210. An extrapolation of the shipment's volume can be made based, for example, on the A/B ratio and historical data—e.g., previously inspected digital images where the number of pixels occupied by the shipment has been correlated to the shipment's volume. For example, based on historical data from previously inspected digital images, an A/B ratio can be determined to correspond to C number of volume units of shipment 200.

In some embodiments, computer vision model 860 can provide surface area measurements for shipment 200, calculate the shipment's footprint on pallet 210, or provide other important measurements that can be used as input parameters for the AI model.

Figure 10:
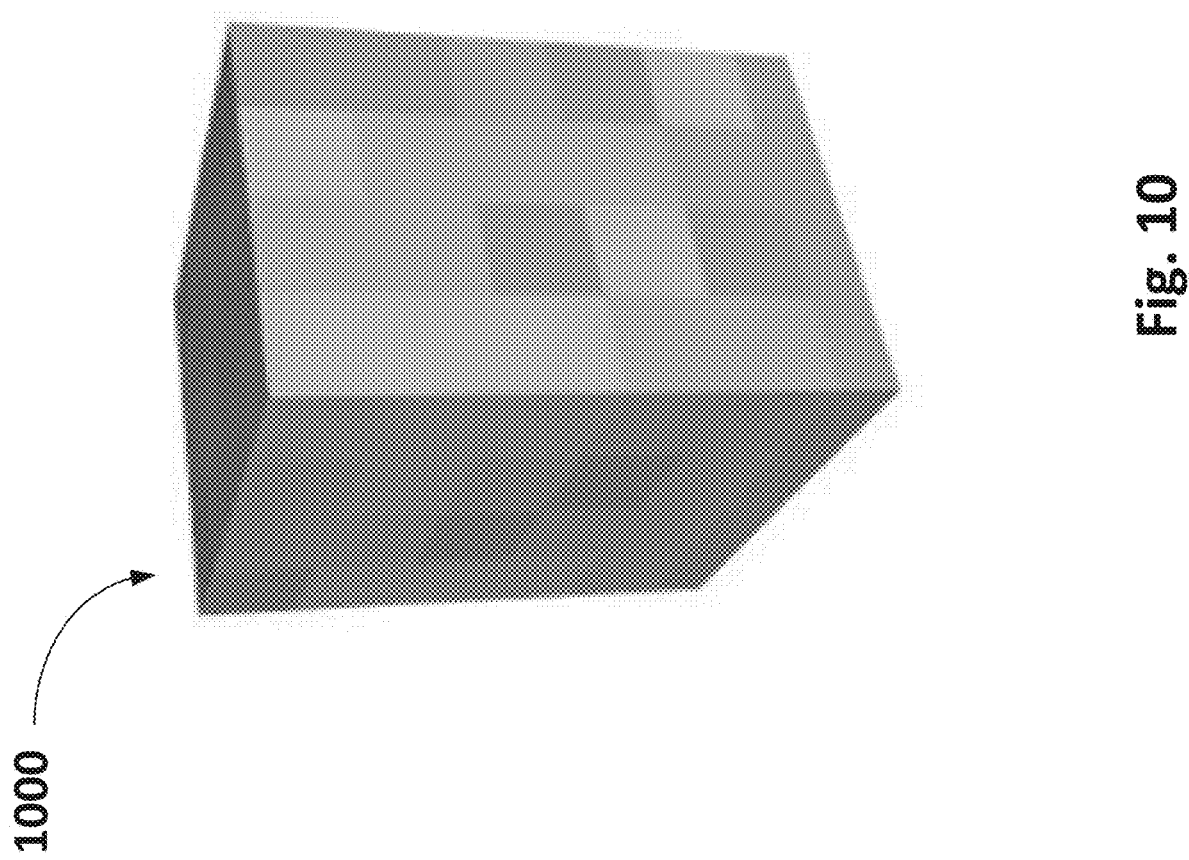
FIG. 10 is a 3-D rendering of pallet with a shipment thereon, according to some embodiments.

In some embodiments, a combination of computer vision model 860 and other related machine learning (ML) and geometry-oriented algorithms can be configured to generate a three-dimensional (3-D) reconstruction (e.g., a 3-D rendering) of shipment 200 on pallet 210 based on the extracted information (e.g., raw data) from the digital images. In some embodiments, the 3-D reconstruction can be viewed by user 706 via software application 702 and be compare to the source image. If the computer vision model has accurately extracted the information from the digital image, the 3-D reconstruction would appear identical to the source image in terms of proportions, viewing angle, tilt, etc. Therefore, user 706 is in position to evaluate in real time whether computer vision model 860 has successfully and accurately extracted the information from the real image. According to some embodiments, FIG. 10 is a 3-D rendering of shipment 1000 which may, for example, correspond to a shipment on a pallet, like shipment 200 on pallet 210 shown in FIG. 2.

In some embodiments, the output data from computer vision model 860 (e.g., pallet and shipment dimensions, shipment footprint, shipment area, etc.) can be stored locally in a library, such as result data library 810 shown in FIG. 8. Like image library 800, result data library 810 can be a HDD, SSD, a memory bank, or another suitable storage medium in which the components of server 720 have read and write access.

In referring to FIG. 1A, method 100 continues with operation 115 where server 720 identifies a suitable AI model to calculate the volume of shipment 200 from the processed digital images (e.g., from the output data of computer vision model 860). In some embodiments, and in referring to FIG. 8, AI model 870 in analytics module 850 of server 720 can be selected from a list of available models in a model library 820. In some embodiments, the selection of AI model 870 can be based on the data generated by computer vision model 860 in operation 110 (e.g., pallet and shipment dimensions, shipment footprint, shipment area, shipment type, pallet size, etc.). For example, different AI models may be available based on a predetermined set of criteria to provide an accurate shipment volume calculation. By way of example and not limitation, the type or size of pallet 210, the shipment's dimensions, the origin of the shipment, or any combination thereof can be factors that determine which AI model is best suited for the shipment volume calculation. However, this is not limiting, and a single AI model can be trained to handle all types of pallet sizes and shipment combinations. In some embodiments, the selection of the AI model from model library 820 occurs automatically without input from user 706 (e.g., based on the digital image data). Alternatively, the selection of the AI model from model library 820 can be based from a combination of information extracted by the digital images (e.g., as described above) and from information provided by user 706 (e.g., pallet dimensions if known, shipment origin, shipment type, etc.).

In some embodiments, AI model 870 uses the data produced by computer vision model 860 according to operation 110 as input parameters—for example, AI model 870 having access to result data library 810, imports the output data generated by computer vision model 860 (e.g., the pallet and shipment dimensions, the shipment footprint, the shipment area, etc.). In some embodiments, ML is used to train AI model 870. The training process, which is described below, includes training AI model 870 with one or more sets of test training data. In some embodiments, the imported data from data library 810 may be reformatted before being processed by AI model 870. According to some embodiments, AI model 870 does not use information such as the shipment's edges or the number of boxes in shipment 200 as input parameters to calculate the shipment's volume. Instead, the model compares the dimensions of shipment 200 relative to the dimensions of pallet 210 (e.g., as provided by computer vision model 860) to extrapolate the volume of shipment 200 on pallet 210. For example, calculate the product of the length, width (depth), and height of shipment 200 minus any volume attributed to voids. The calculated volume of shipment 200 according to operation 115 can be saved in result data library 810 and used in subsequent operations.

Figure 11:
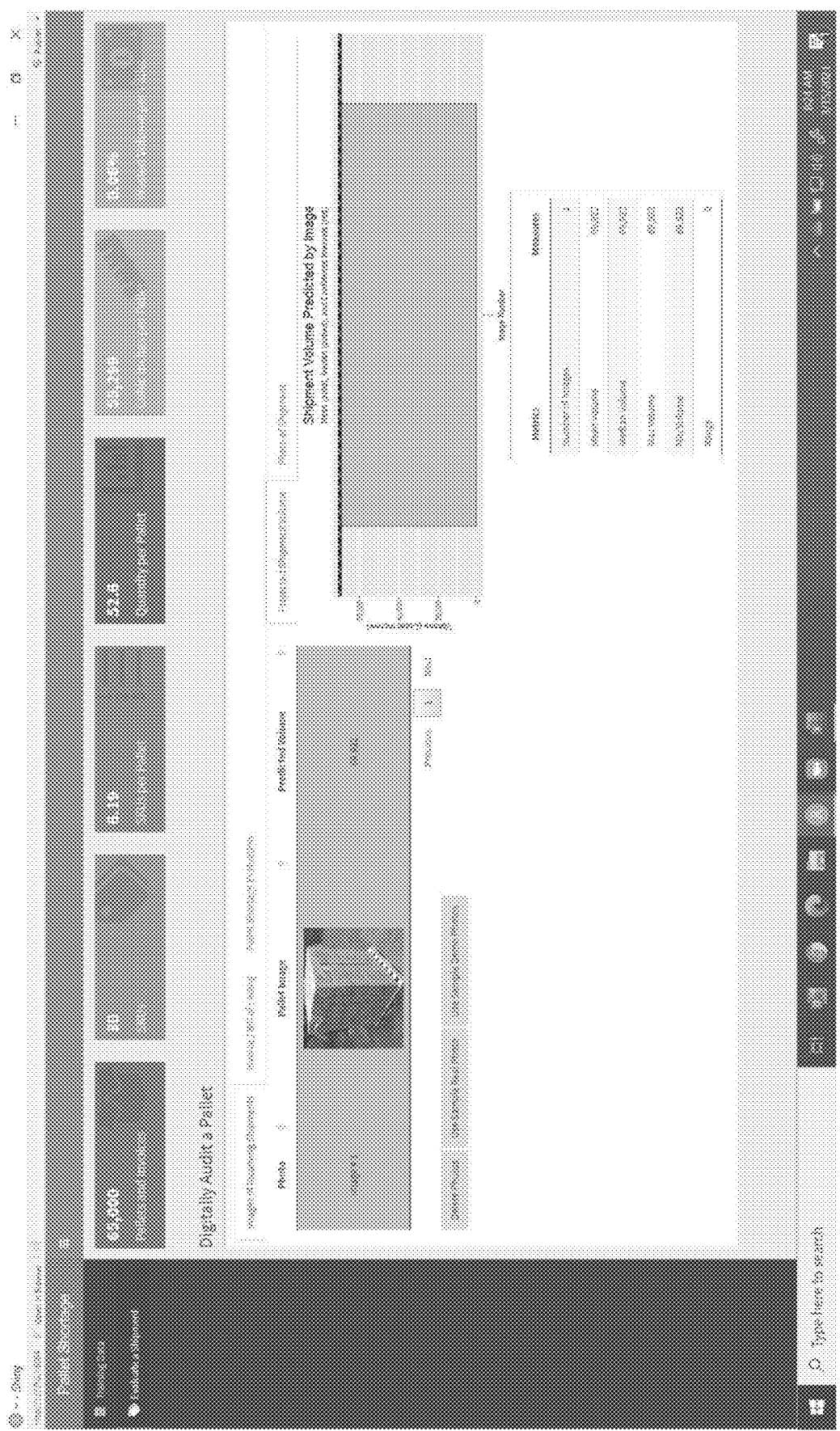
FIG. 11 is a screen shot from a software application that shows a shipment's volume prediction based on a real image of the shipment, according to some embodiments.

In some embodiments, once AI model 870 calculates (e.g., predicts) the shipment's volume from the provided digital image(s), server 720 transmits the shipment's volume information via network 707 back to software application 702. In software application 702, the shipment's volume can be presented in a tabulated form, in a graph, or any combination thereof for user 706 to review. Therefore, the shipment information can be available to user 706 in real time once server 720 processes the digital image(s). By way of example and not limitation, FIG. 11 is a screen shot from software application 702, as viewed by user 706, that shows a shipment's volume prediction based on a real image of the shipment.

In referring to FIG. 1A, method 100 continues with operation 120 where server 720 receives invoice information corresponding to shipment 200. In some embodiments, the invoice information can be in the form of a digital image or an electronic document uploaded to server 720 via software application 702. For example, user 706 can use mobile device 704 or digital camera 710 to obtain a digital image of the shipment's invoice. Alternatively, user 706 can scan the invoice or use an existing electronic copy of the invoice to upload it to server 720 using software application 702. Subsequently, software application 702 transmits, via network 708, the digital image or the electronic copy of the shipment's invoice to server 720. By way of example and not limitation, the invoice information can be stored locally in image library 800 of server 720 shown in FIG. 800.

In some embodiments, the invoice information includes at least an itemized list of the products in shipment 200 (e.g., the product identification ("ID")) and their respective quantities (e.g., the number of units per product). By way of example and not limitation, the invoice information can include products A, B, C, . . . , and N and respective number of units per product $N_A$, $N_B$, $N_C$, . . . , and $N_n$. In some embodiments, the product ID is a stock keeping unit (SKU) number, a universal product code (UPC) or any number or code that is uniquely associated with the product. It is noted that any type of document that includes at least an itemized list of product IDs and their respective quantities can be used in operation 120 (e.g., an invoice, a purchase order, an excel spreadsheet, etc.).

In some embodiments, and in referring to FIG. 8, NLP model 880 in the analytics module 850 of server 720 parses the received invoice information and identifies each product ID and its associated quantity. NLP model 880 may subsequently export the invoice information in a format that can be easily processed by an AI model. By way of example and not limitation, NLP model 880 can use one-hot encoding to convert categorical variables—such as the name of each product—to numerical values. The data conversion may occur outside NLP model 880 by a data processing routine. In some embodiments, the output data from NLP model 880 can be saved in result library 910 of server 720 and subsequently transmitted to software application 702 via network 707.

Figure 12:
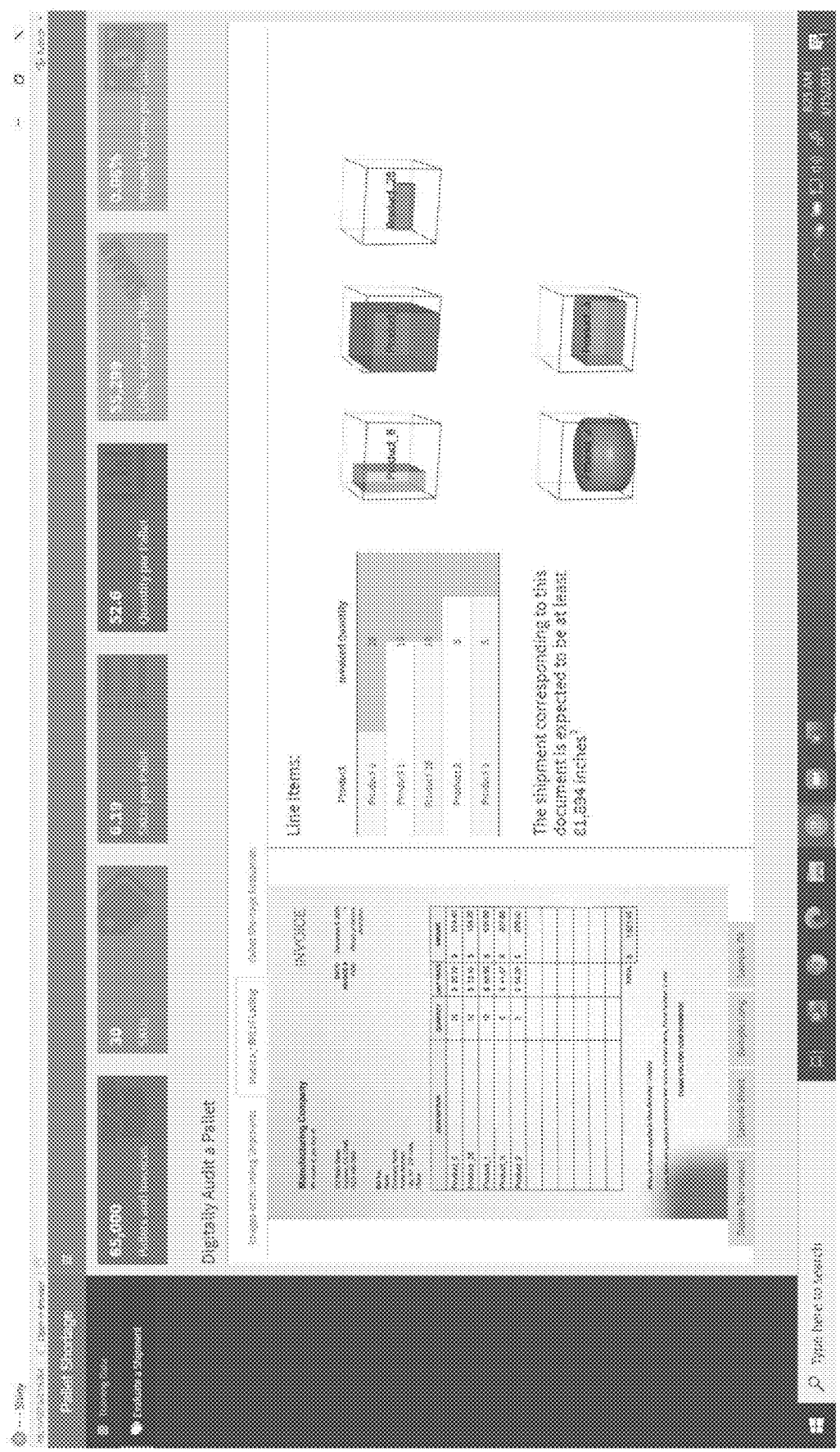
FIG. 12 is a screen shot from a software application that shows processed invoice information, according to some embodiments.

In some embodiments, the invoice information received from server 720 are presented in software application 702 in the form of a table or a graph (e.g., a bar graph) for user 706 to review. Therefore, the processed invoice information by server 720 can be available to user 706 in real time. User 706 may then review the processed invoice information to ensure that the products and their quantities have been accurately captured. By way of example and not limitation, FIG. 12 is a screen shot from software application 702, as viewed by user 706, that shows processed invoice information returned from server 720.

In referring to FIG. 1B, method 100 continues with operation 125 where server 720 retrieves product information based on the received invoice information. In some embodiments, the product information is previously generated and saved in a product library of server 720—such as a product library 830 shown in FIG. 8—during a training process described below. By way of example and not limitation, the product information in product library 830 includes a "net transport volume" for each product in shipment 200. In some embodiments, the net transport volume refers to the volume of a product on pallet 210 when one or more product units are packaged together into one or more boxes like boxes 220 shown in FIG. 2. In some embodiments, the net transport volume of a product includes the product's volume in its original packaging (e.g., cereal box, cans of tuna, soda bottle, etc.) and any additional volume resulting from the use of packaging material in each box 220, such as cardboard, packaging peanuts, packaging foam, bubble wrap, and the like.

For example, cans of tuna may only require a cardboard base and a plastic wrapping, while wine glasses may require additional packaging material, such as padding, packaging peanuts, bubble wrap, etc. Therefore, the net transport volume for the wine glasses may be substantially different from the actual product volume (e.g., the glasses) whereas the net transport volume for the tuna can be similar or substantially similar to the volume of the tuna cans, which is the original packaging material of the tuna meat. In some embodiments, the net transport volume for a product can be expressed in volume units per product unit. For example, the net transport volume of soda bottles can be expressed in cubic feet per bottle, cubic meters per bottle, etc.

Figure 13:
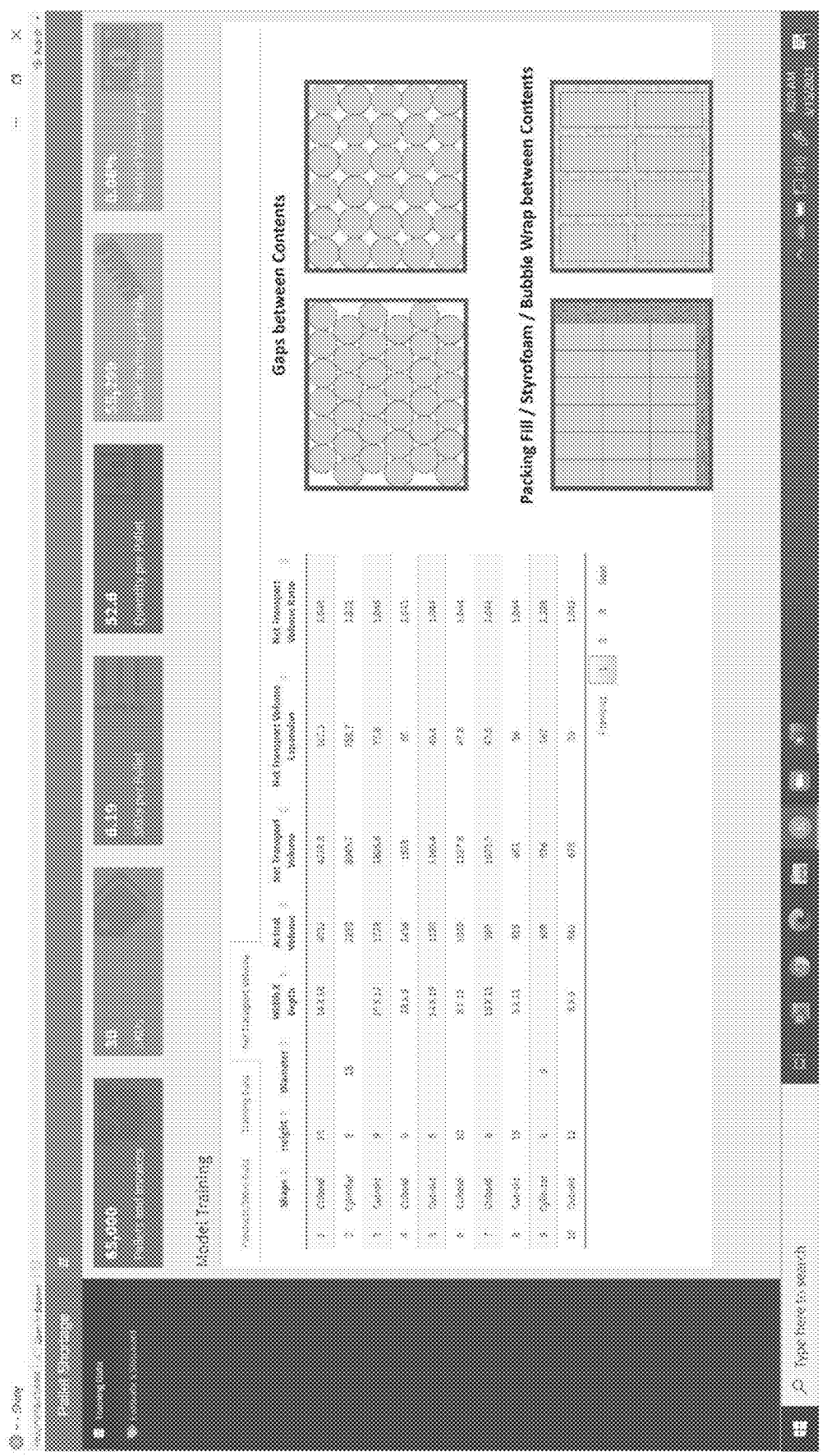
FIG. 13 is a screen shot from a software application that shows examples of packing rules for products with different shapes and dimensions, according to some embodiments.

By way of example and not limitation, FIGS. 3-6 are plan views of different products packaged into packaging boxes (e.g., boxes 220 of shipment 200 shown in FIG. 2). The examples shown in FIGS. 3-6 are not limiting and demonstrate various ways in which products can be packaged within a box and, further, how the presence of gaps or packaging material can affect the net transport volume of the product. Consequently, the net transport volume can vary significantly between products as discussed above. In some embodiments, FIGS. 3-6 can be used to generate packing rules for different products. By way of example and not limitation, packing rules for a product may include product information such as whether the product needs to be boxed before going on a pallet, the orientation of the product when packed, the maximum stacking height of the product, whether the product can support weight or must be on the top of the shipment, any packaging material requirements, its actual volume, its net transport volume, etc. The packing rules can be used to train the AI model. By way of example and not limitation, FIG. 13 is a screen shot from software application 702 that shows examples of packing rules for products with different shapes and dimensions. In the example of FIG. 13, the actual volume of each product is listed and compared to its net transport volume, and a net transport volume ratio is calculated based on a ratio between the actual volume of the product and its net transport volume.

According to operation 130, server 720 can estimate the total volume of shipment 200 by first calculating the volume of each product in shipment 200, and subsequently adding all the estimated volumes from all the products. For example, the volume of a product in shipment 200 can be calculated by multiplying the net transport volume of that product with the corresponding product quantity listed in the invoice information. Adding the product volume estimates for all the products would yield the total volume of the shipment based on the invoice information (e.g., the product ID and the product quantity) as shown, for example, in FIG. 12.

Therefore, server 720 can determine, based upon the quantities of the products in the invoice, what should be the anticipated volume of the packaged product on pallet 210. Accordingly, server 720 can calculate the volume of the entire shipment based on the invoice information, provided that the net transport volume for each product in shipment 200 is available and stored in product library 830. If the net transport volume for a product is unavailable, server 720 cannot provide a volume estimate for that product based on the invoice information. In the event that server 720 does not recognize a product, server 720 can send an alert to software application 702 to alert user 706 that a net transport volume for a product is missing and therefore, the shipment's volume calculation will not include the product with the missing net transport volume.

In some embodiments, access to additional product libraries and/or net transport volume values can be available to server 720 in locations outside server 720—e.g., in a cloud storage location. In some embodiments, the net transport volume for each product can be dynamically updated based on new packaging information and product information. Additionally, new products may be added as needed in product library 830 (e.g., daily, weekly, monthly, quarterly, yearly, etc.) and be accessible by server 720.

In some embodiments, the volume estimated in operation 130 is stored in result data library 810 of server 720 to be used in subsequent operations, such as operation 135 shown in FIG. 1B. In some embodiments, the results from server 720 in operation 130 are also transmitted, in real time, to software application 702 where they can be presented to user 706 in the form of a graph, a table, or at any suitable format. In some embodiments, user 706 receives the volume estimate calculated in operation 130 as soon as the results from server 720 become available and stored in result data library 810.

In some embodiments, the net transport volume for a product can be calculated with an AI model. By way of example and not limitation, the AI model used to estimate the net transport volume can be trained with a set of training data stored in training library 840 of server 720. The training data can include appropriately formatted data from previously received shipment invoices whose product list (e.g., product IDS) and corresponding product quantities have been verified and the volume information for each product is known. The AI model can use, for example, ML, regression analysis (e.g., linear or non-linear) or other suitable statistical methods to extrapolate the net transport volume of each product based on the information provided through the training data. Parameters of the analysis (e.g., regression coefficients) can be adjusted during training until the net transport volume for each product is calculated so that, when combined with the product quantity, it yields the actual product volume in the shipment. The training data can include input from sufficient number of invoices to obtain reliable statistical data. The training data may contain information for a variety of shipment types and/or pallet types.

The aforementioned training method of the AI model used to extrapolate the net transport volume is not limited to the above description and alternative methods are within the spirit and the scope of this disclosure. In some embodiments, the net transport volumes of each product is subsequently saved in product library 820 as discussed above.

In some embodiments, the AI model described above can be selected from model library 820 of server 720. For example, several AI models can be saved and trained with the method described above. By way of example and not limitation, the AI model selection for the calculation of the net transport volume can be based on metrics such as confidence levels, data fitting performance, overall training duration for each model, etc.

Figure 14A:
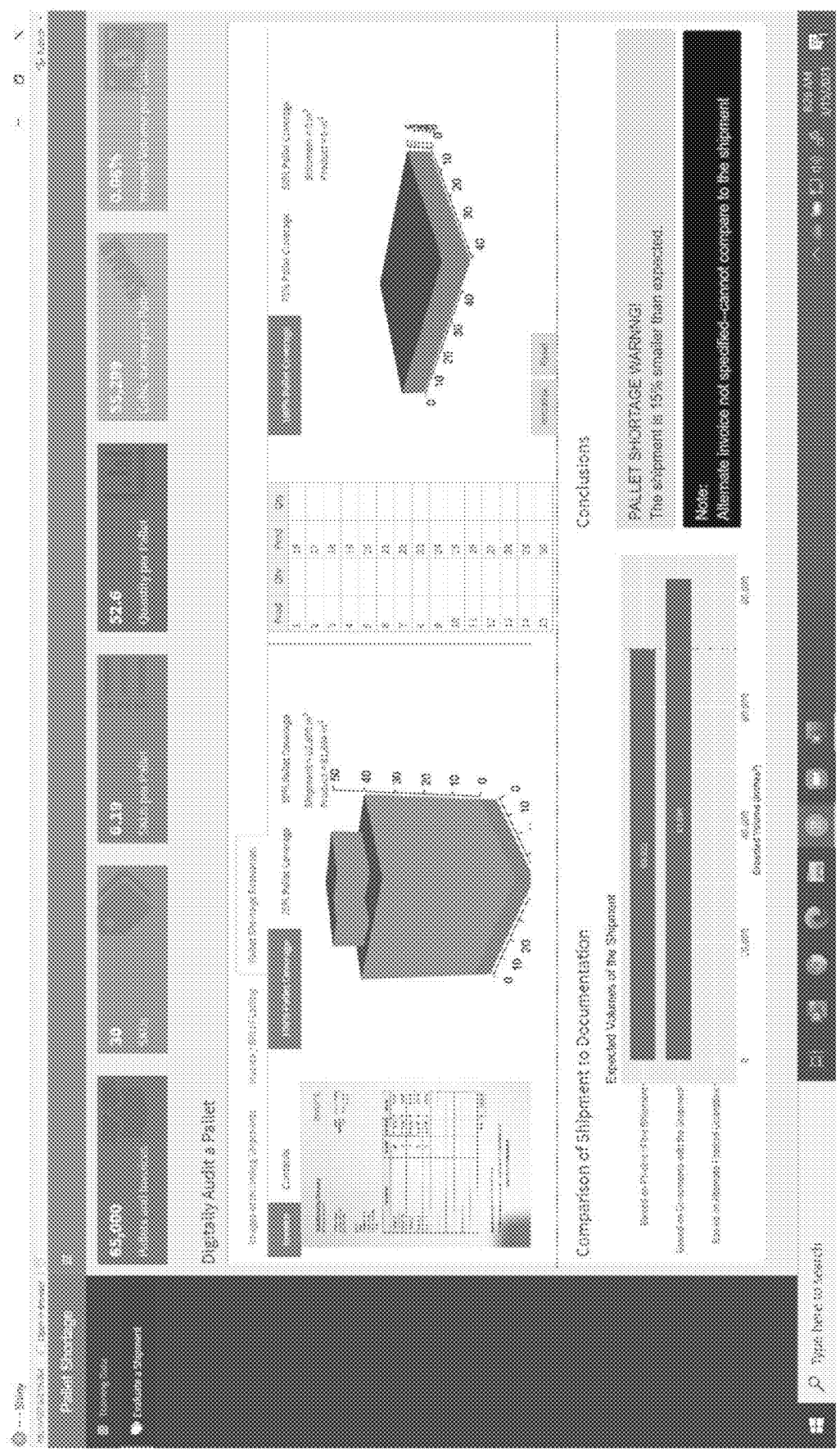
FIGS. 14A and 14B are screen shots from a software application that show a comparison between a shipment's volume as predicted from invoice information and a volume calculated from the shipment's digital image(s), according to some embodiments.

In referring to FIG. 1B, method 100 continues with operation 135 where server 720 compares the shipment volumes calculated from the digital images (e.g., in operation 115) and the product information (e.g., in operation 130) to provide a volume difference. In some embodiments, each of the aforementioned shipment volumes is retrieved from result data library 810 and arithmetically compared to each other. If the comparison shows that the volume difference is within a predetermined threshold according to operation 140, server 720 transmits a message to mobile device 704, via software application 702, indicating that there is no discrepancy between the two calculated volumes according to operation 150. Therefore, software application 702 alerts user 706 that shipment 200 matches the invoice information, and therefore user 706 may accept pallet 210 with shipment 200. On the other hand, if the comparison shows that the volume difference is outside the predetermined threshold, server 720 generates an alert transmitted to mobile device 704 via software application 702 to alert user 706 that shipment 200 does not match the invoice information according to operation 145. Therefore, user 706 may reject shipment 200 or flag shipment 200 for further examination. By way of example and not limitation, FIG. 14A is a screen shot from software application 702, as viewed by user 706, that shows a comparison between the shipment's volume as predicted from the invoice information and the volume calculated from shipment's digital image(s). In the example of FIG. 14A, a mismatch between the two volumes is identified and user 706 is warned with a message that the shipment volume calculated from the digital image(s) is 15% smaller than the one predicted from the invoice information.

Figure 14B:
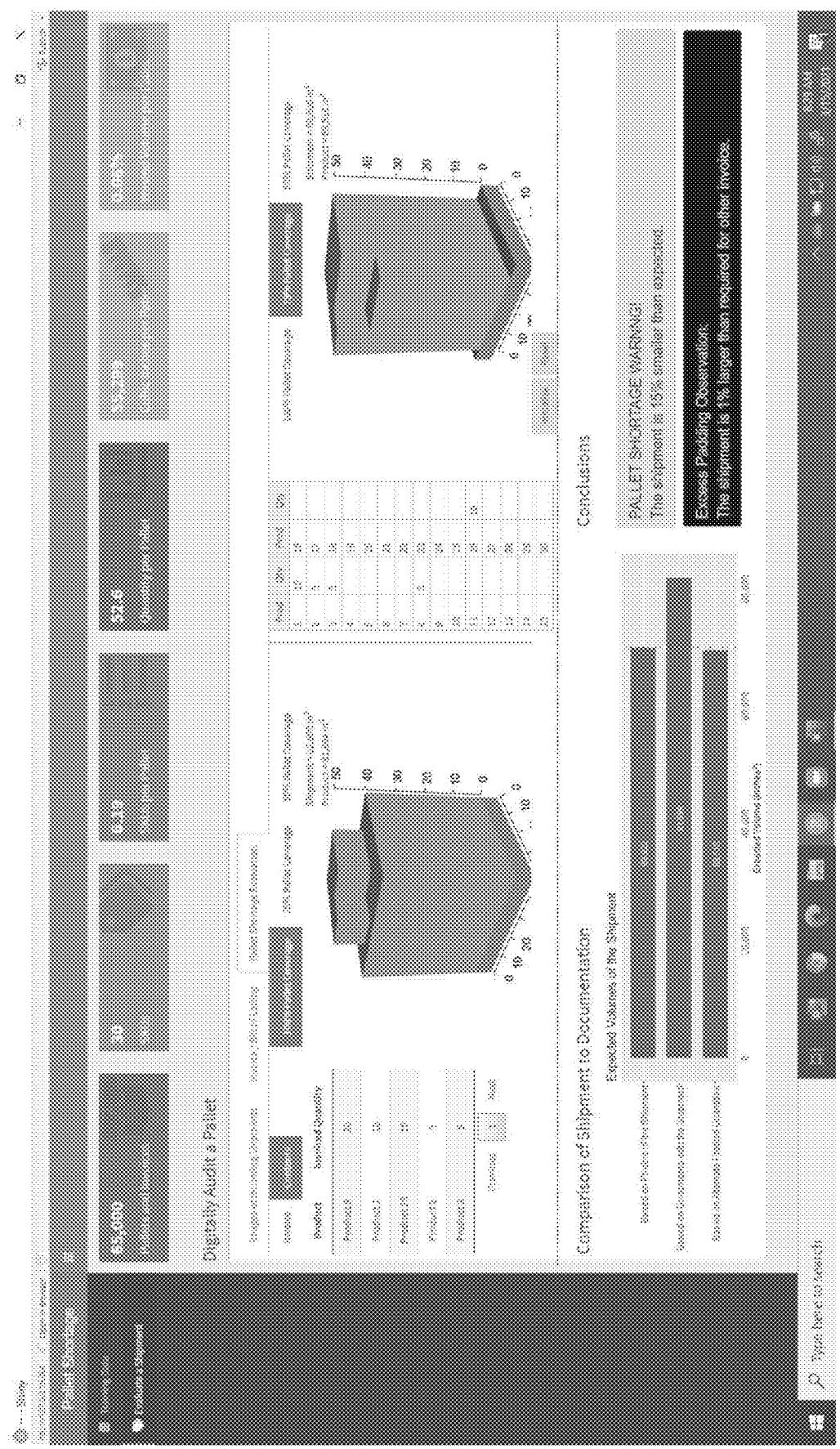

In some embodiments, the AI model may attempt to determine which product(s) are likely to be missing in a situation where a mismatch is identified. For example, the AI model may generate a 3-D rendering of the pallet with fewer items as shown in the screen shot of FIG. 14B.

In some embodiments, the order of operations in method 100 is not limiting to the one shown in FIGS. 1A and 1B. For example, operations 115 can be performed after operation 125 and prior to operation 130. In some embodiments additional permutations are possible; for example, operation 120 may be performed prior to operation 105. These permutations between the operations of method 100 are within the spirit and the scope of this disclosure.

As discussed above, the models used in method 100 are first trained and subsequently used in method 100. By way of example and not limitation, AI model 870 used in operation 115 can be trained as follows. AI model 870, which may be trained using ML, can be trained with a set of training data stored in training library 840 of server 720 shown in FIG. 8. The training data can include appropriately formatted data from previously received shipment images whose contents and volume information are known and documented. AI model 870 can use, for example, regression analysis (e.g., linear or non-linear) or other suitable statistical methods to extrapolate the shipments' volume based on the training data. Parameters of the analysis (e.g., regression coefficients) can be adjusted during training until the calculated volume from AI model 870 best fits the actual volume data. In other words, the fitting parameters can be adjusted during the training session until an acceptable fit to the real data is obtained. The training data can include input from any number of digital images sufficient to obtain reliable statistical data. The training data may contain information from a variety of shipments and pallet types.

The aforementioned training method of the AI model in operation 115 is not limited to the above description and alternative methods are within the spirit and the scope of this disclosure.

In some embodiments, once AI model 870 is trained, it can be saved in model library 820 shown in FIG. 8. According to some embodiments, it is possible to develop different AI models for shipments from different vendors or for different types of shipments. Therefore, one or more AI models may be developed, saved, and retrieved from model library 820.

In some embodiments, method 100 can be modified to use the shipment's weight instead for the shipment's volume described above. For example, AI models used for operation 115 and the calculation of the net transport volume can be trained to derive the weight of the shipment based on the provided digital images and the net transport weight, respectively.

In the case of the shipment's weight, the training process of the aforementioned AI models can be based on similar principles to the ones described above with respect the shipment's volume. For example, with respect to operation 115 and the calculation of the shipment's weight based on digital images of the shipment, AI model 870 can be trained with a set of training data, which include appropriately formatted data from previously received shipment images whose contents and weight information are already known and documented. AI model 870 can use, for example, ML, regression analysis (e.g., linear or non-linear), or other suitable statistical methods to extrapolate the shipments' weight based on the training data provided. Parameters of the analysis (e.g., regression coefficients) can be adjusted during training until the calculated weight from AI model 870 best fits the actual weight of the shipment. In other words, the parameters can be adjusted during the model's training phase until an acceptable fit of the real data is achieved. The training data can include input from any number of digital images sufficient to obtain reliable statistical data. The training data may contain information from a variety of shipments and pallet types.

Similarly, the AI model used to calculate the net transport volume can be trained to calculate the net transport weight of a product. In the case of the net transport weight, the training data can include appropriately formatted data from previously received shipment invoices whose product list (e.g., product ids) and corresponding product quantities have been verified and the packaged weight information for each product is known. The net transport weight corresponds to the net weight of a product when the weight of additional packaging material is accounted for. The AI model can use, for example, ML, regression analysis (e.g., linear or non-linear), or other suitable statistical methods to extrapolate the net transport weight of each product based on the training data. Parameters of the analysis (e.g., regression coefficients) can be adjusted during the training phase until the net transport weight for each product is calculated so that, when combined with the product quantity, it yields the actual product weight in the shipment. The training data can include input from any number of invoices sufficient to obtain reliable statistical data. The training data may contain information for a variety of shipment types and/or pallet types.

In some embodiments, method 100 can be used at the supplier end to ensure that the product quantities shipped match the invoice information. For example, every shipment on a pallet can be analyzed to determine whether the shipment volume matches the invoice information in real time, during loading. Therefore, any mismatches can be identified in real time and corrected prior to shipping.

In addition, server 720 shown in FIG. 7 can have additional functionalities for different entities in the distribution chain to minimize shipment errors and disputes. For example, data collected at a supplier that ships products across different recipients can be analyzed. More specifically, the server can generate a daily report that informs the supplier how much product across all recipients has been delivered compared to what was supposed to be shipped based on the invoice or order information. The server could identify which shipments have excess supply and which ones have shortages in real time during loading. On the recipient end, a recipient could aggregate information across shipments received from multiple suppliers, generate analytics on which suppliers have more volume errors compared to others.

In some embodiments, operations of method 100 can be applied to optimize space usage in truck trailers at a supplier site. For example, server 720 can estimate the volume of a shipment based on an invoice order, and by comparing a shipment's volume to the trailer's capacity, recommend either to remove product items from the order or add product items to the order so that the shipment's volume fills the entire trailer. Alternatively, server 720 can recommend shipment volumes that are, for example, exact multiples or exact submultiples of a full trailer to best utilize the space in the trailer.

Similarly, method 100 may be applied to other areas of the freight industry including, but not limited to, cargo train cars, containers, cargo ships, cargo airplanes, etc. Additionally, method 100 may be used in storage facilities to improve storage efficiency. For example, method 100 may recommend shipment volumes that best utilize the storing space in a warehouse.

By way of example and not limitation, the following examples present ways in which the AI models discussed above (e.g., the AI models used in operations 115 and 125) can be trained from a pool of synthetic and real data. The term "synthetic data", as used herein, refers to production data not obtained by direct measurement. In some embodiments, synthetic data simulate real data for training and testing purposes.

Training the AI Model with Random Synthetic Data

According to some embodiments, FIG. 15 shows flow charts 1500A and 1500B, which describe the creation process of synthetic data and the training process of the AI model using the synthetic data, respectively. The processes described herein are not limited to the operations or steps described. For example, additional operations or steps, not described herein, may be required to complete the processes. These additional operation or steps are not shown or discussed for simplicity.

Figure 16:
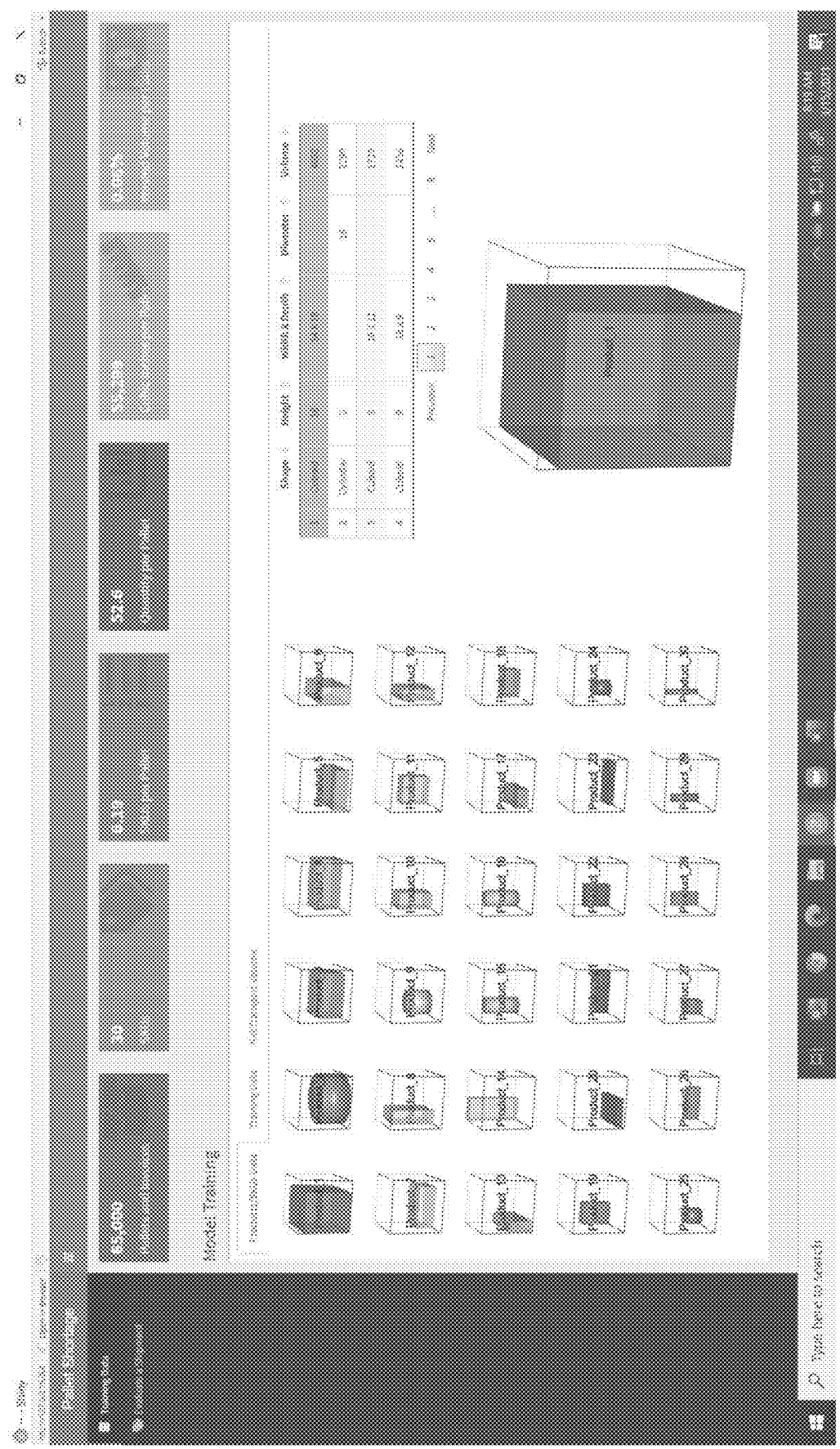
FIG. 16 is a screen shot from a software application that shows a random product creation, according to some embodiments.

In referring to flow chart 1500A, the creation process of synthetic data begins with step 1505 and the process of randomly creating P different products. During the product creation, the shapes of each product is selected—e.g., cylindrical, cubical, etc. Additionally, the dimensions of each product are defined and its volume is calculated. In some embodiments, a length dimension (e.g., length, width, or height) of a product can be selected from a range between about 1 inch and about 4 feet. However, this range is exemplary and not limiting. Therefore, other ranges within or outside the aforementioned range can be used based on real product dimensions. By way of example and not limitation, FIG. 16 is a screen shot from the random product creation step described above. FIG. 16 is populated with exemplary products having different shapes and dimensions.

Flow chart 1500A continues with step 1510 and the process of selecting packing rules for each product. During this step, it is determined whether the product must be boxed before going on a pallet, the orientation of the product when packed, the maximum stacking height of the product, whether the product can support weight or must be on top of the shipment, and any packing material requirements. In some embodiments, more than one packing rule may available for each product. For example, there may be several packing rules for each product based on the different possible ways one can pack a product. As discussed above, FIG. 13 is a screen shot from software application 702 that shows examples of packing rules for products with different shapes and dimensions. In the example of FIG. 13, the actual volume of each product is listed and compared to its net transport volume, and a net transport volume ratio is calculated based on a ratio between the actual volume of the product and its net transport volume.

Flow chart 1500A continues with step 1515 and the process of creating I different invoices. During this step, a number of simulated invoices can be generated by selecting random products, and their respective quantities, from a products list created in step 1505.

Flow chart 1500A continues with step 1520 and the process of digitally packing a pallet for each of the I invoices created in step 1515. During step 1520, and for each invoice I, a simulated pallet is generated with a simulated shipment thereon according to the product list in the invoice. In some embodiments, the digital packing of the pallet is based on the dimensions of the pallet, the items in the invoice, and the packing rules of the included products.

Since a pallet can be loaded in different ways based on a number of available packing rules for each product, step 1520 is repeated a random number of times according to step 1525 in flow chart 1500A. This is done to capture all the possible ways a pallet can be loaded based on the available packing rules for each product.

Flow chart 1500A continues with step 1530 and the process of determining geometric features of the simulated shipment on each pallet. In some embodiments, the geometric features of the simulated shipment explicitly define all the characteristics of the shipment's shape including edges, corners, bulges, protrusions, etc. In a first approximation, the geometric features should include shapes (e.g., a cylinder, a cuboid, a box, etc.), at a second approximation, the geometric features should include descriptions such as X units by Y units by Z units, and at a third approximation the geometric features should include additional details such as box shape with top left edge being a 2 inch and a quarter round and the top right edge being a sharp 90 degree edge, etc. Therefore, the geometric features should provide a description in as much detail as possible so that someone who cannot see the pallet knows exactly what it looks like.

Figure 17:
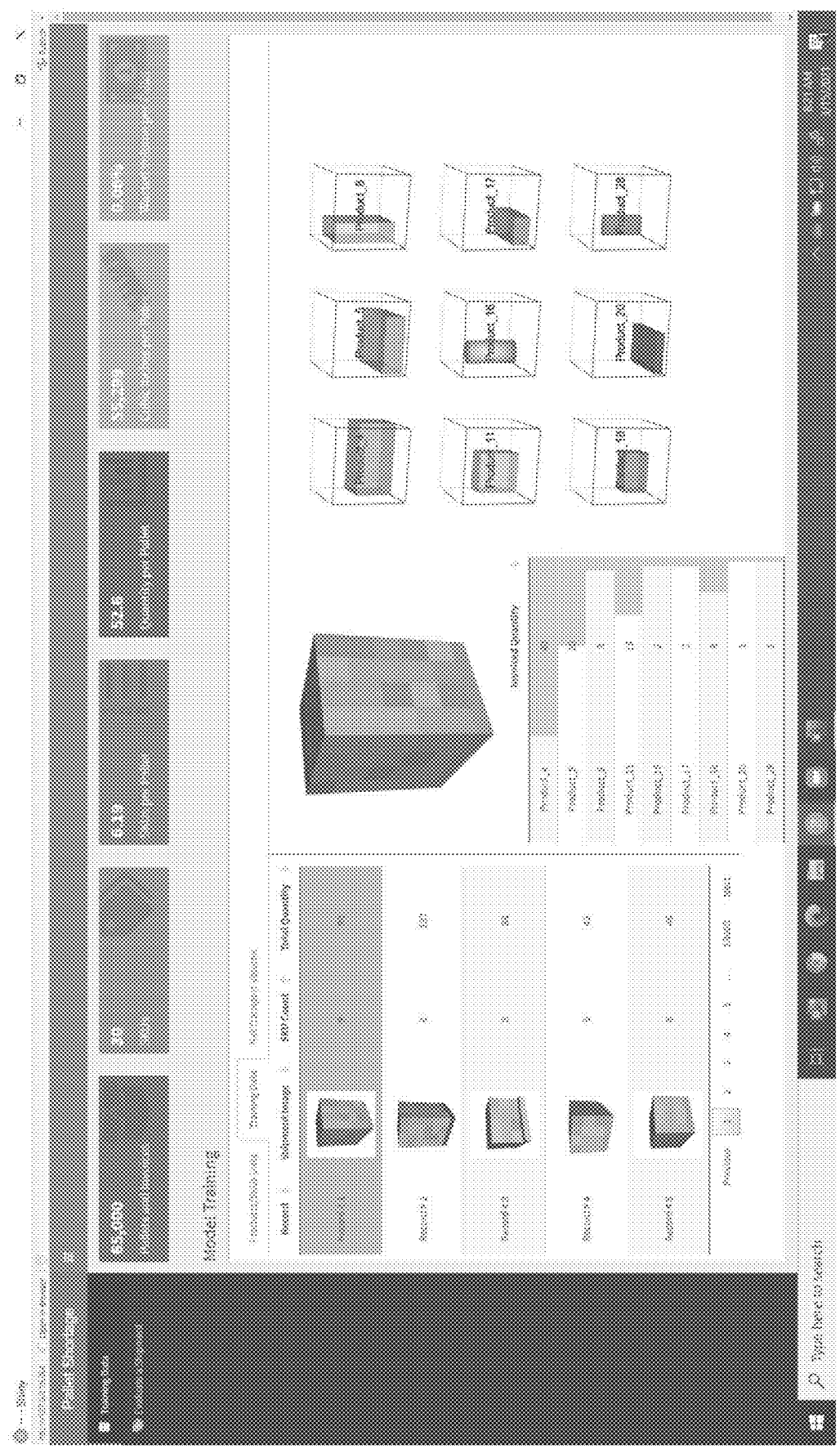
FIG. 17 is a screen shot from a software application that shows a randomly created invoice, a digitally assembled pallet, and a 3-D rendering of the shipment based on a randomly created invoice information, according to some embodiments.

Lastly, in step 1535, create a random number of digital images for each pallet with its shipment. In some embodiments, creating digital images includes creating 3-D renderings of each pallet with its shipment from steps 1520 and 1525. In some embodiments, each 3-D rendering can be generated having different viewing angles and perspectives. According to some embodiments, FIG. 17 is a screen shot from software application 702 that shows a randomly created invoice, a digitally assembled pallet, and a 3-D rendering of the shipment based on the randomly created invoice information.

Flow chart 1500B shows the training process for the AI model. AI model can use the random synthetic data generated in flow chart 1500A. Flow chart 1500B begins with step 1540 and the process of creating a training data set and a test data set. In some embodiments, creating a training data set and a test data set includes randomly selecting 75% of all the digital photos (and their corresponding geometric features) generated in steps 1520 and 1525 of flow chart 1500A as a training data set and keep the remaining 25% as the test dataset.

Flow chart 1500B continues with step 1545 and the process of modeling each geometric feature of the shipment from the digital images. In some embodiments, modeling each geometric feature from the digital images includes: (i) using the geometric features from the digital images in the training data set as dependent input parameter for a multi-layer neural network that decomposes the pixels into a stream of numbers (e.g., from 0 to 255), (ii) vectorizing the pixel data, and (iii) feeding the data into the multi-layer neural network. In some embodiments, each layer of the multi-layer neural network includes a respective activation function, which applies a transformation to the incoming data. The modeling further includes modifying the weights within each layer of the multi-layer neural network until the aggregated error between the predicted and actual dependent input parameter is below a threshold value.

In some embodiments, the modeling process described above in step 1545 is repeated for each of the geometric features (e.g., the size, the shape, the contour, the length, the width, the height, and the volume) of the shipment and for each digital image.

In step 1550 of flow chart 1500B, the AI model is tested. In some embodiments, testing the model includes using the test data set on the AI model.

In step 1555 of flow chart 1500B, the AI model is adjusted (e.g., tweaked) based on the test results. In some embodiments, adjusting the AI model includes, but is not limited to, adding or removing nodes from one or more layers of the multi-layer neural network, adding or removing layers from the multi-layer neural network, and/or testing different activation functions for one or more layers of the multi-layer neural network. In some embodiments, once the adjustments are made to the neural network, testing is repeated and a new round of adjustments may be made if the test results are not satisfactory.

In step 1555 of flow chart 1500B, the previous steps of flow chart 1500B (e.g., steps 1540 through 15555 are repeated. In some embodiments, the previous steps are repeated with different splits between the training data and test data. Based on these splits, additional invoices are created and the model is tested and trained on the additional invoice information. This process may be repeated multiple times until the testing results are consistent (e.g., no longer improve), the predictions are consistent, and the margin of error is low. In other words, the process is repeated until a "steady state" is achieved.

In some embodiments, the training process of the AI model can use data generated with different processes from the one described in flow chart 1500B as will be discussed below. For example, the AI model can be trained using "real" synthetic data, actual "real" synthetic data, and actual data. The processes for creating the aforementioned types of data will be discussed next with respect to FIGS. 18, 19, and 20 respectively.

Training the AI Model with "Real" Synthetic Data

Figure 18:
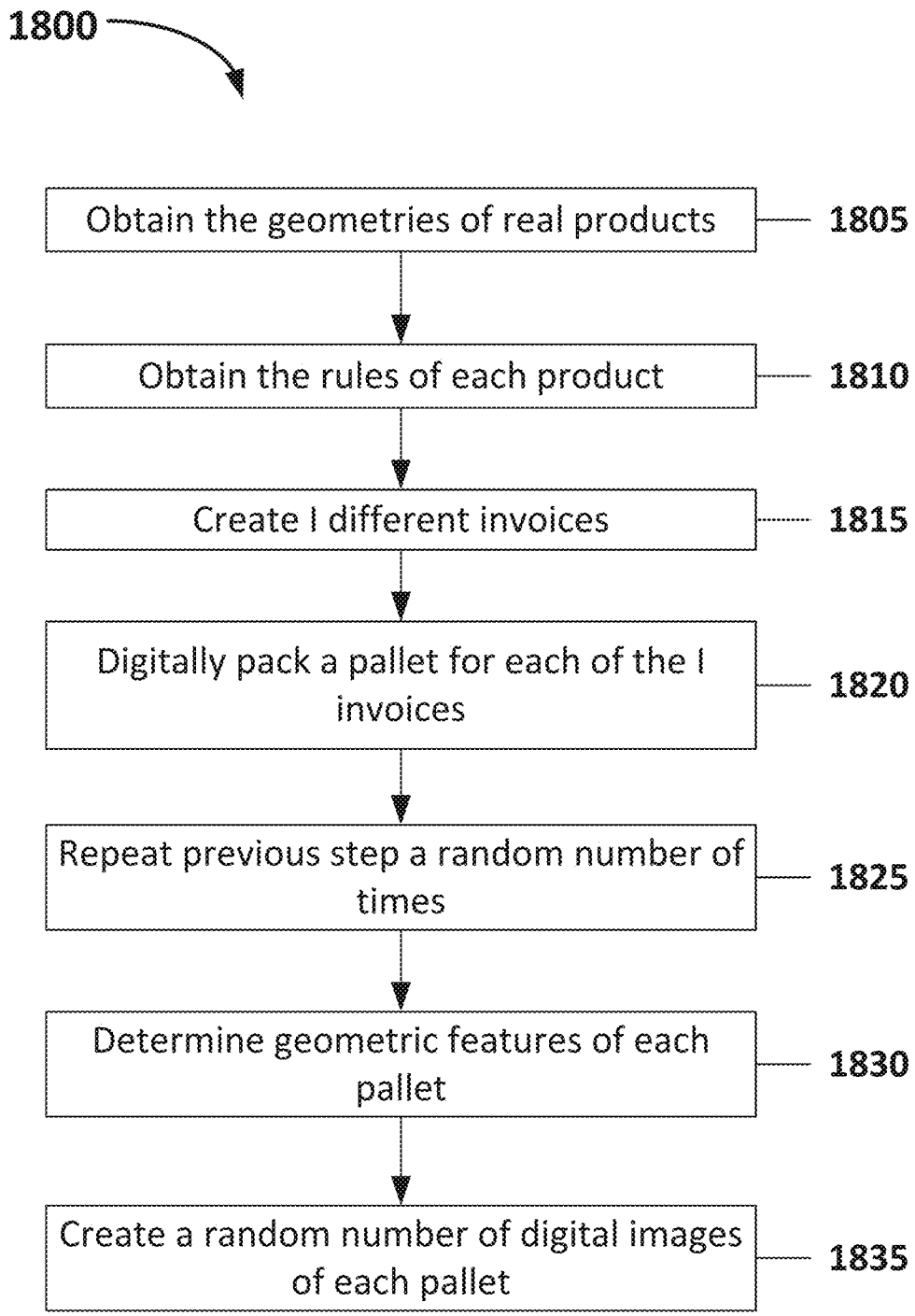
FIG. 18 is a flow chart that describes a creation process of real synthetic data, according to some embodiments.

According to some embodiments, the creation of "real" synthetic data shown in flow chart 1800 of FIG. 18 is similar to the creation of synthetic data discussed above in flow chart 1500A shown in FIG. 15. The differences between flow charts 1500A and 1800 is in the first two steps. For example, in flow chart 1800, steps 1805 and 1810 use real products instead of the simulated products. Meanwhile, steps 1815 through 1835 are identical to steps 1515 through 1535. For simplicity and to avoid unnecessary repetition, only steps 1805 and 1810 will be described.

Flow chart 1800 begins with step 1805 and the process of obtaining the geometries of real products. This process includes getting the geometric characteristics of, for example, boxes of cereal, bottles of soda, loaves of bread, etc. As discussed above, the geometric characteristics include the size, the shape, and the dimensions of the real products.

Flow chart 1800 continues with step 1810 and the process of obtaining the rules for each product. This is similar to step 1510 described above where it is determined whether the product must be boxed before going on a pallet, the orientation of the product when packed, the maximum stacking height of the product, whether the product can support weight or must be on top of the shipment, and any packing material requirements. In some embodiments, more than one packing rule may available for each product. For example, there may be several packing rules for each product based on the different possible ways one can pack a product.

After steps 1805 and 1810, flow chart 1800 continues like flow chart 1500A. Once the process of flow chart 1800 is complete, the AI model can be trained using flow chart 1500B and the data generated by flow chart 1800.

Training the AI Model with Actual "Real" Synthetic Data

Figure 19:
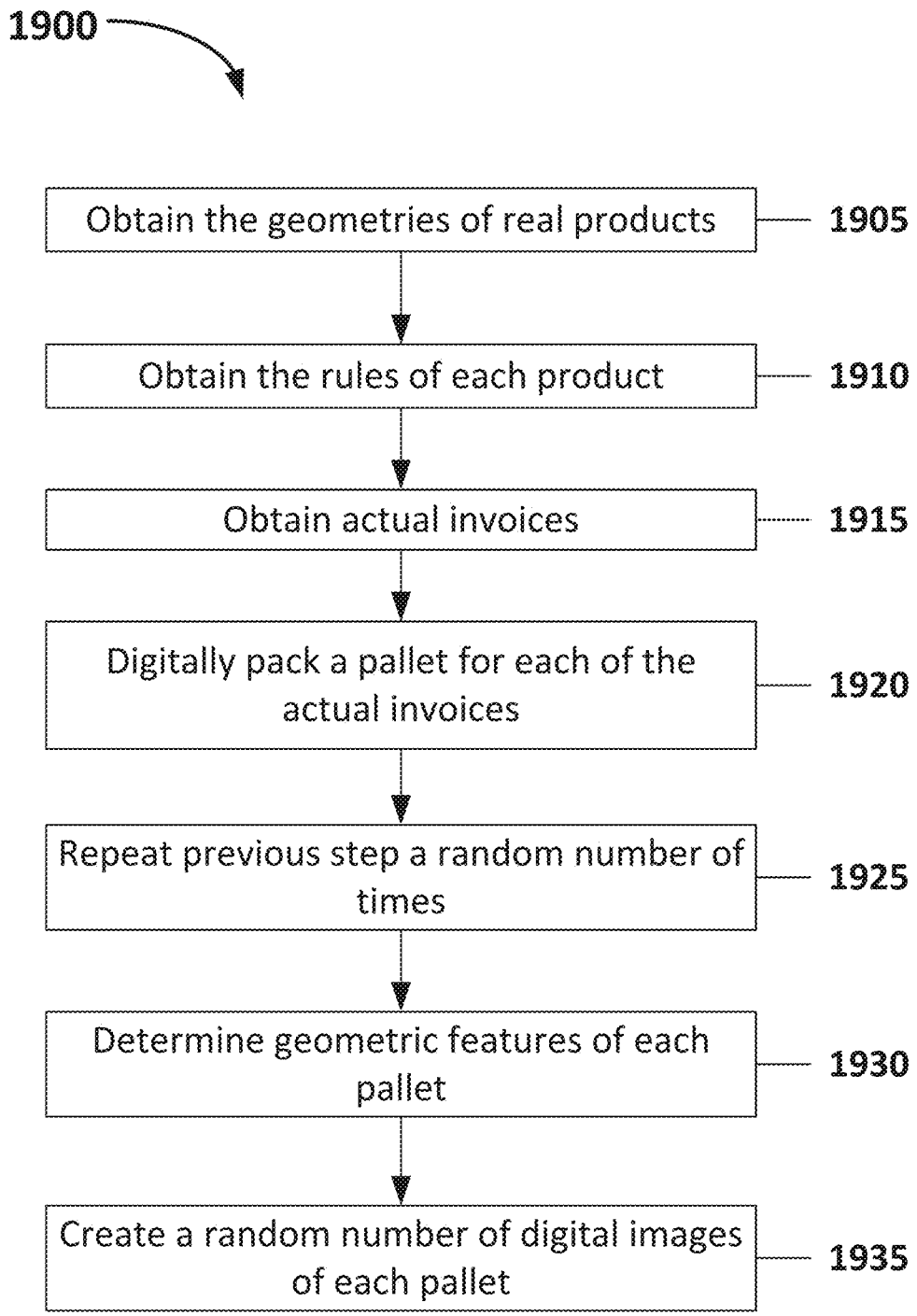
FIG. 19 is a flow chart that describes a creation process of actual real synthetic data, according to some embodiments.

According to some embodiments, the creation of actual "real" synthetic data shown in flow chart 1900 of FIG. 19 is similar to the creation of "real" synthetic data discussed above (e.g., in flow chart 1800) with the exception that flow chart 1900 uses "actual invoices" (e.g., real invoices from purchased products) for step 1915 and any subsequent step. The remaining steps of flow chart 1900 are performed in an identical manner with the corresponding steps of flow chart 1800.

Once the process of flow chart 1900 is complete, the AI model can be trained using flow chart 1500B and the data generated by flow chart 1900.

Training the AI Model with Actual Data

Figure 20:
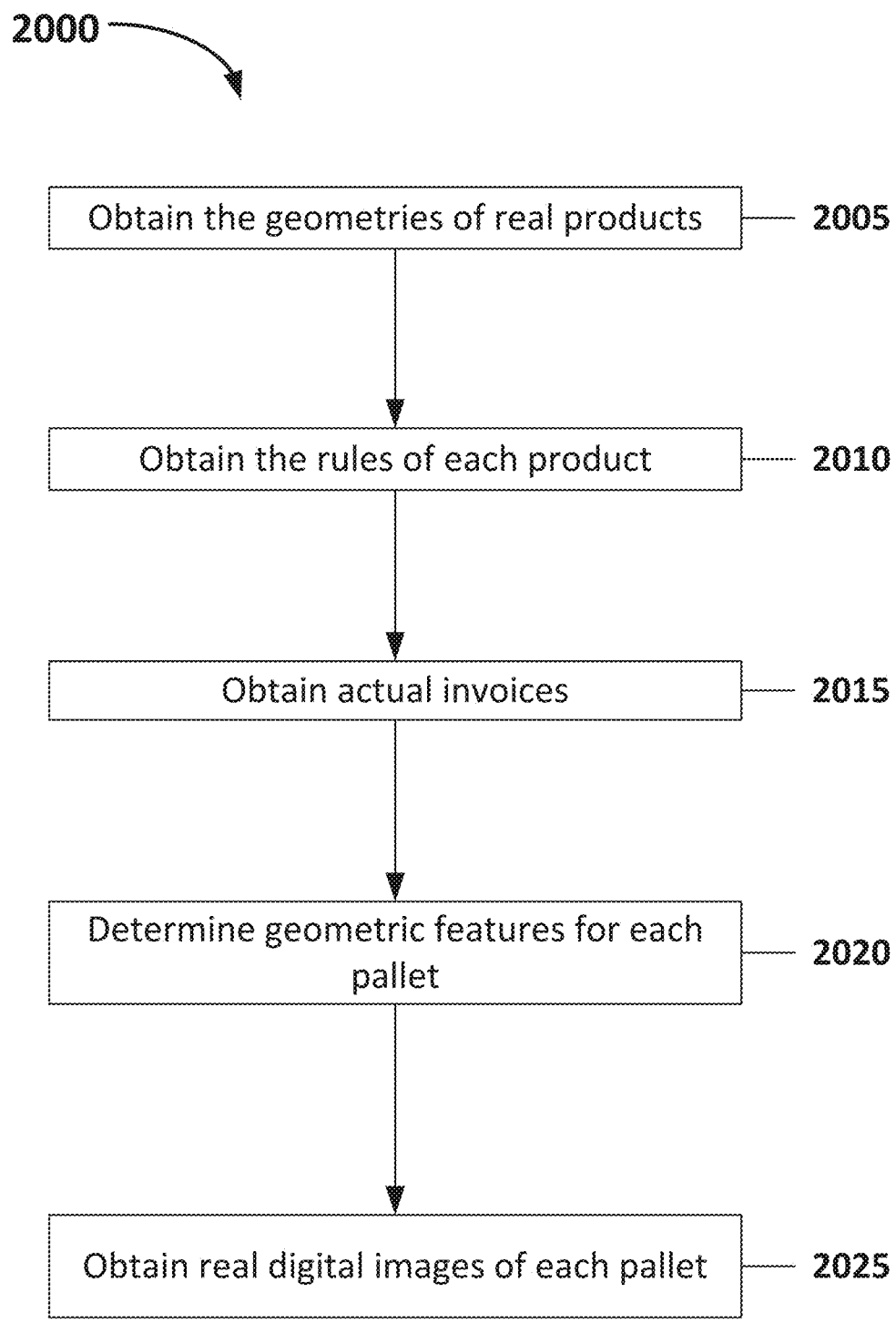
FIG. 20 is flow chart that describes a creation process of actual data, according to some embodiments.

According to some embodiments, the creation of actual data is shown in flow chart 2000 of FIG. 20. In some embodiments, flow chart 2000 includes a subset of the steps shown in flow chart 1900. For example, flow chart 2000 does not include the operations described in steps 1920 and 1925 of flow chart 1900. This is because digital images of real shipments on a pallet can be used instead of creating 3-D renderings of pallets with shipments. Further, step 1935 is replaced by step 2025 since real digital images are available for use.

Once the process of flow chart 2000 is complete, the AI model can be trained using flow chart 1500B and the data generated by flow chart 2000.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with the figures above. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for detecting shipment shortages, the method comprising:
    taking one or more digital images of a pallet with a shipment thereon;
    uploading the one or more digital images to a server;
    using a computer vision model to process the uploaded one or more digital images and obtain geometric features of the shipment;
    identifying an artificial intelligence (AI) model to calculate a first volume of the shipment based on the geometric features;
    receiving invoice information corresponding to items in the shipment;
    retrieving item information from the received invoice information;
    providing a second volume for the shipment based on the item information;
    calculating a difference between the first and second volumes; and
    in response to the difference being outside a threshold value, generating an alert.

2. The method of claim 1, wherein the geometric features comprise a size, a shape, a contour, a length, a width, a height, and a volume of the shipment.

3. The method of claim 1, further comprising:
    in response to the difference being within a threshold value, generating a message that the first and second volumes are comparable.

4. The method of claim 1, wherein the AI model is a multi-layer neural network that uses the geometric features as input parameters.

5. The method of claim 1, wherein retrieving the item information comprises parsing the invoice information with a natural language program.

6. The method of claim 1, wherein providing the second volume for the shipment comprises retrieving a net transport volume for each item in the shipment.

7. The method of claim 1, wherein providing the second volume for the shipment comprises calculating a net transport volume for each item in the shipment.

8. A computer program product for detecting shipment shortages, the computer program product comprising a non-transitory computer-readable medium having computer readable program code stored thereon, the computer readable program code when executed by one or more processors causes the one or more processors to:
    take one or more digital images of a pallet with a shipment thereon;
    upload the one or more digital images to a server;
    use a computer vision model to process the uploaded one or more digital images and obtain geometric features of the shipment;
    identify an artificial intelligence (AI) model to calculate a first volume of the shipment based on the geometric features;
    receive invoice information corresponding to items in the shipment;
    retrieve item information from the received invoice information;
    provide a second volume for the shipment based on the item information;
    calculate a difference between the first and second volumes; and
    generate an alert when the difference is outside a threshold value.

9. The computer program of claim 8, wherein the geometric features comprise a size, a shape, a contour, a length, a width, a height, and a volume of the shipment.

10. The computer program of claim 8, wherein the computer readable program code when executed by the one or more processors further causes the one or more processors to generate a message that the first and second volumes are comparable when the difference is within a threshold value.

11. The computer program of claim 8, wherein the AI model is a multi-layer neural network that uses the geometric features as input parameters.

12. The computer program of claim 8, wherein the received invoice information is parsed by a natural language processing (NPL) model to retrieve the item information.

13. The computer program of claim 12, wherein the item information comprises at least an item identification and an item quantity.

14. The computer program of claim 8, wherein the second volume is provided by identifying each item in the invoice information, retrieving a net transport volume for each identified item, and adding each net transport volume from each identified item to estimate the second volume.

15. The computer program of claim 14, wherein the net transport volume for an item is equal to or greater than an original packaging volume of the item.

16. The computer program of claim 8, wherein the second volume is a sum of net transport volumes corresponding to items in the shipment.

17. The method of claim 1, providing the second volume comprises:
   identifying each item in the invoice information;
   retrieving a net transport volume for each identified item; and
   adding each net transport volume from each identified item to estimate the second volume.

18. The method of claim 17, retrieving the net transport volume for each identified item comprises matching each identified item to its corresponding net transport volume.

19. The method of claim 1, wherein the net transport volume for an item is equal to or greater than an original packaging volume of the item.

20. The method of claim 1, wherein prior to identifying the AI model to calculate the first volume, training the AI model to make volume predictions based on the geometric features in digital images of a training dataset.

* * * * *